United States Patent [19]

Goodwin

[11] Patent Number: 4,798,227

[45] Date of Patent: Jan. 17, 1989

[54] VALVE FOR A PATIENT SUPPORT STRUCTURE

[75] Inventor: Vernon L. Goodwin, Charlotte, N.C.

[73] Assignee: SSI Medical Services, Inc., Charleston, S.C.

[21] Appl. No.: 43,618

[22] Filed: Apr. 28, 1987

Related U.S. Application Data

[62] Division of Ser. No. 814,610, Dec. 30, 1985, Pat. No. 4,745,647.

[51] Int. Cl.[4] .................... F16K 37/00; F16K 31/04; F16K 31/50

[52] U.S. Cl. .................... 137/554; 137/883; 251/129.11; 251/205; 251/266

[58] Field of Search .................... 137/554, 883; 251/205, 251/266, 267, 268, 129.11; 340/870.35

[56] References Cited

U.S. PATENT DOCUMENTS

| | | | |
|---|---|---|---|
| 1,805,106 | 5/1931 | Robinson | 251/205 |
| 1,850,850 | 3/1932 | Peterson | 251/205 |
| 1,898,147 | 2/1933 | Smith | 251/266 X |
| 2,914,088 | 11/1959 | Beaman et al. | 251/266 X |
| 3,068,902 | 12/1962 | Brumbaugh | 251/205 X |
| 3,092,141 | 6/1963 | Stark | 137/883 |
| 3,433,261 | 3/1969 | Fox | 137/883 |
| 3,459,221 | 8/1969 | Axelrod | 137/883 |
| 3,810,136 | 5/1974 | Lang et al. | 340/870.35 X |
| 3,820,094 | 6/1974 | Mouri et al. | 340/870.35 |
| 4,471,942 | 9/1984 | Kocanowski | 251/205 |
| 4,609,074 | 9/1986 | Berrend | 137/883 |

*Primary Examiner*—John Rivell
*Attorney, Agent, or Firm*—Dority & Manning

[57] ABSTRACT

An improved patient support structure comprises an articulatable frame, a plurality of elongated inflatable sacks, a low pressure compressed air blower and a plurality of pipes for carrying gas from the blower to the sacks. A multi-outlet, variable flow, gas valve comprises a housing defining an inlet and a passageway. The valve housing further defines at least two cylinder chamber communicating with the passageway and a discrete outlet for each cylinder chamber communicating therewith. A piston is substantially non-rotatably disposed inside each cylinder chamber and has a threaded opening through the center thereof with receives a threaded portion of a rotatable shaft therethrough. One end of the shaft is rotated by a motor, and the other end of the shaft is connected to an axle of a potentiometer.

14 Claims, 11 Drawing Sheets

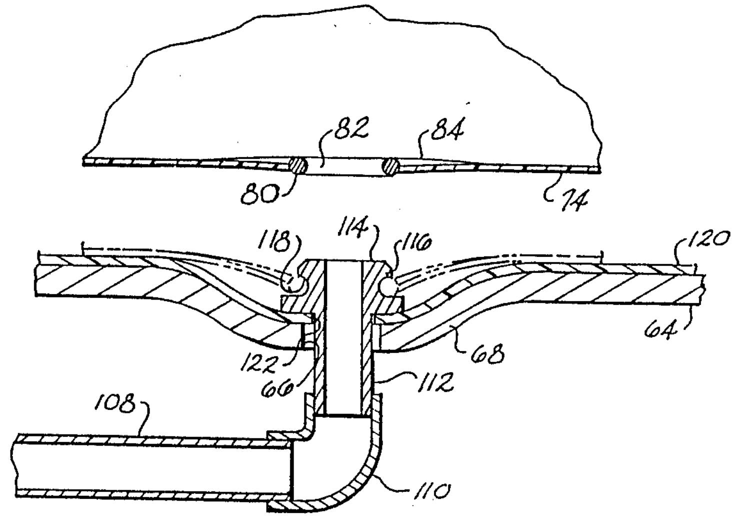
Fig. 6
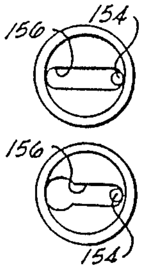
Fig. 8a
Fig. 8b
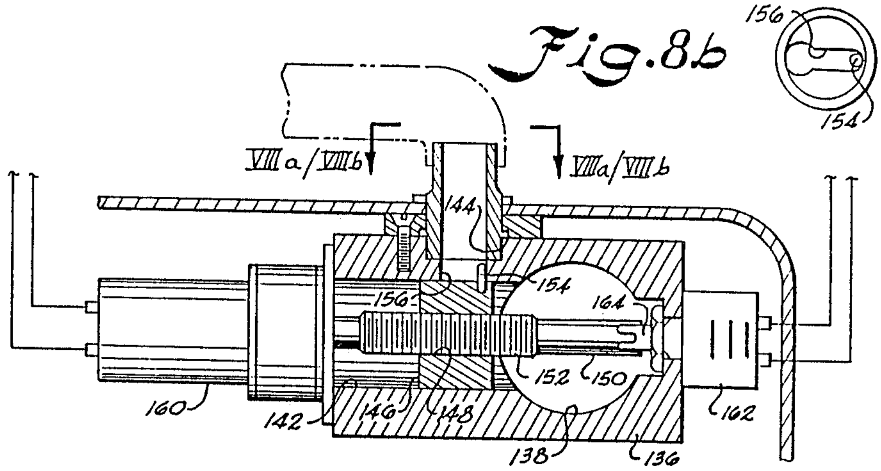
Fig. 7

VALVE FOR A PATIENT SUPPORT STRUCTURE

This is a division, of application Ser. No. 06/814,610 filed 12-30-85, now U.S. Pat. No. 4,745,647.

BACKGROUND OF THE INVENTION

The present invention relates to an improved patient support structure, and more particularly to a patient support structure having a plurality of gas-filled sacks upon which the patient is supported.

U.S. Pat. No. 4,488,322 to Hunt et al discloses a mattress and bed construction having inflatable air sacks mounted on the mattress and connected to ports of header chambers which are incorporated in the mattress. Air is supplied to the sacks via conduits connected to the header chambers. The mattress is laid on the rigid, tubular steel frame base of a standard hospital bed. The inflatable sacks are mounted transversely of the mattress and connected to the header chambers on opposite sides by releasable connectors. Air is passed into the header chamber on one side of the mattress and exhausted from the air sack on the opposite side through a corresponding exhaust header chamber. A control valve regulates the flow of air which is permitted to escape from the exhaust header chambers to permit individual control of the pressure and rate of flow of air through each air sack or group of air sacks. The air sacks are divided into groups so that the sacks in each group can be set at a pressure which is appropriate for the part of the patient's body which is supported at that point. The air inlet and exhaust ports and control valves are grouped together in a single housing or pair of housings located at one end of the mattress. The control valves prevent air leakage from one of the air sacks from affecting the remainder of the sacks. A bellows is provided for adjusting the contour or overall shape of the mattress, and remotely operated air valves are provided for operating the bellows. The remotely operated air valve comprises a chamber divided by a flexible diaphragm into an inlet and an outlet, the diaphragm being movable between two extreme positions. The outlet includes a tube which projects into the chamber, and at one of the extreme positions of the diaphragm, the end of this inlet tube is sealed by the diaphragm. When the diaphragm is at its other extreme position, the diaphragm allows air to escape into the chamber through the tube.

In U.S. Pat. No. 4,099,276 to Hunt et al, a support appliance is disclosed as having articulated sections in which at least one section is raised pneumatically by means of a bellows, the raisable section having a hinged connection with the adjacent section to allow relative movement of the pivoting sections longitudinally of the appliance during relative angular movement. A control valve is disposed between the bellows and a source of pressurized air, the control valve being arranged to feed air automatically to the bellows as required to maintain the bellows in a predetermined inflated condition. The valve is connected to the hinged portion of the bed by a mechanical connection such as a line and pulley system which is able to accommodate the movement of the hinged part relative to the fixed part of the bed because the axis about which the hinged portion pivots, is not fixed. This movable axis eliminates the problem of the inflated sacks preventing the desired pivoting movement.

U.S. Pat. No. 3,909,858 discloses a bed comprising air sacks formed with excess material which is used to attach the sacks to an air supply manifold, with the..air pressure cooperating with the excess material to create a seal.

British Patent specification No. 1,273,342, published on May 10, 1972, discloses an air fluidized bed having a plurality of inflatable air cells, which are either formed of porous material or provided with air escape holes that provide air circulation beneath the patient. Valves are provided for independently inflating groups of cells so that the cells supporting the different regions of the patient can be provided with different levels of air pressure.

OBJECTS AND SUMMARY OF THE INVENTION

It is a principal object of the present invention to provide an improved patient support structure comprising a plurality of inflatable sacks in which combinations of adjacent sacks define support zones that support different regions of the patient at differing sack pressures without causing distortion of the shapes of the sacks defining the extreme sacks of adjacent support zones of differing pressures.

It is a further object of the present invention to provide an improved patient support structure comprising a plurality of inflatable sacks that are divided into support zones which are provided with a means of easily altering the number of sacks in each zone to accommodate patients who vary widely in height, weight and body shape.

Another object of the present invention is to provide an improved patient support structure comprising a plurality of inflatable sacks having means for varying the rate of delivery of gas to the sacks to allow modest flows for small people, greater flows for large people, and a still larger flow to overinflate the bags for facilitating patient transfer from the support structure.

A still further object of the present invention is to provide an improved patient support structure comprising a plurality of inflatable sacks wherein a number of adjacent sacks are provided with means for conveniently deflating same for lowering a patient closer to the floor and stabilizing the patient before removal from the support structure.

Another object of the present invention is to provide an improved patient support structure comprising a plurality of inflatable sacks atop a rigid planar surface, wherein means are provided for quickly deflating particular sacks for lowering a patient supported thereon to the planar surface to facilitate application of an emergency medical procedure, such as CPR, which requires a solid surface beneath the patient.

A further object of the present invention is to provide an improved patient support structure comprising a plurality of inflatable sacks, wherein the structure is articulatable to elevate different portions thereof and the pressures in adjacent sacks at a particular location automatically adjust according to the degree of elevation of the patient.

Another object of the present invention is to provide an improved patient support structure comprising a plurality of inflatable sacks, the support structure being articulatable and provided with automatic step-wise adjustment of pressures in the sacks as the support structure is elevated and further permitting a limited range of continuous pressure adjustment under the control of the patient.

It is a further object of the present invention to provide an improved patient support structure that is articulatable and has a plurality of inflatable sacks wherein the sacks and users are protected against pinch points during articulation of the structure, and the structure is easily cleanable and prevents fluid discharges from soiling the structure.

An additional object of the present invention is to provide an improved patient support structure having a plurality of inflatable sacks that protects a patient being moved across the support structure, from any skin damage that otherwise might result from contact with the fittings used to connect the sacks with a gas source.

A further object of the present invention is to provide an improved patient support structure comprising a plurality of inflatable sacks that provides a means of signaling when a portion of the patient is resting against an insufficiently inflated sack.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the improved patient support structure of this invention comprises a frame and a plurality of elongated inflatable sacks. Disposed side-by-side atop the frame, the sacks have opposing side walls, opposing top and bottom walls, and opposing end walls.

The end walls of the sacks have upper and lower attachment means thereon.

Gas supply means is provided in communication with each of the sacks for supplying gas to same. The gas supply means preferably comprises a blower which supplies low pressure air and a plurality of pipes and pipe manifolds for carrying the air from the blower to the individual sacks. The gas supply means further comprises an individual gas conduit means for each sack. The gas conduit means preferably comprises a relatively short length of flexible tubing.

Control means associated with the gas supply means and the sacks is provided for controlling supply of gas to each of the sacks according to a predetermined pressure profile across the plurality of sacks and according to a plurality of predetermined combinations of the sacks. Each combination of sacks defines a separate support zone. The control means preferably includes a variable autotransformer, an adjustment motor mechanically connected to the autotransformer, a control circuit for automatically actuating the adjustment motor according to predetermined operating parameters for the blower, a multi-outlet, variable flow, gas valve, and a control circuit for the multi-outlet valve that automatically controls the valve settings according to predetermined pressure parameters for the sacks.

Sack retaining means is provided for retaining the sacks in a disposition when inflated such that side walls of same are generally vertically oriented with side walls of adjacent sacks being in contact along at least a significant portion of the heights of same. The retaining means has attachment means thereon matable with the sack attachment means for removable securement of the upper and lower sack attachment means for removable securement of the sacks thereto whereby the sacks when inflated are generally maintained in their vertically oriented disposition irrespective of pressure variance between sacks. The retaining means also has attachment means which is matable with the attachment means provided along the frame and adjacent opposite ends of the sacks.

The upper and lower attachment means on the end walls of the sacks preferably comprises upper and lower snap members. The retaining means attachment means and the attachment means provided along the frame adjacent opposite ends of the sacks, also preferably comprise snap members of the type preferred for the upper and lower attachment means of the sacks.

The sack retaining means preferably comprises a plurality of panels formed of material identical to the material forming the sacks and having on one side thereof, snap members matable with the snap members on the end walls of the sacks and with the snap members on the frame.

The present invention further includes a multi-outlet, variable flow, gas valve, comprising a housing defining an inlet and a passageway, the inlet communicating with the passageway; at least one cylinder chamber defined within the housing and communicating with the passageway; a discrete outlet for each of the cylinder chambers and communicating therewith; and means for variably controlling communication of the inlet with each of the outlets through the passageway and through each of the respective cylinder chambers.

The variable communication control means comprises a piston slidably received within each of the cylinder chambers, and means for orienting the piston at a predetermined location within the cylinder chamber. The piston blocks all communication between each of the outlets and the inlet when the piston is oriented at at least one predetermined location within the cylinder chamber. The piston permits maximum communication between the outlet and the inlet through the cylinder chamber when the piston is oriented at another predetermined location within the cylinder chamber. The piston permits a predetermined degree of communication between each outlet and the inlet through each cylinder chamber depending upon the orientation of the piston within each cylinder chamber.

The means for orienting the piston at a predetermined location preferably comprises a threaded opening extending through the piston and concentric with the longitudinal centerline thereof, a shaft having a threaded exterior portion engaging the threaded opening of the piston, means for precluding full rotation of the piston, and means for rotating the shaft whereby rotation of the shaft causes displacement of the piston along the shaft in the cylinder chamber. The direction of the displacement depends on the direction of rotation of the shaft. The means for precluding full rotation of the piston preferably comprises a projection extending from the piston into the outlet. The shaft rotation means preferably comprises a DC electric motor attached to one end of the shaft, either directly or through a reduction gear box.

The multi-outlet, variable flow, gas valve further comprises means for indicating the degree of communication between each of the outlets and the inlet that is being permitted by the piston. The indicating means preferably comprises a potentiometer having a rotatable axle attached to one end of the shaft, for varying the voltage across the potentiometer depending upon the number of rotations of the shaft.

The multi-outlet, variable flow, gas valvefurther comprises flow restriction means received within each outlet. Preferably, the flow restriction means comprises an elongated-shaped opening defined in the housing between the cylinder chamber and the outlet. The longitudinal axis of the opening is oriented parallel to the longitudinal axis of the shaft.

The present invention further comprises means associated with the frame for sensing the degree of articulation of one of the articulatable sections of the frame. The articulation sensing means preferably comprises a rod having one end communicating with one of the articulatable sections of the frame whereby articulating movement of the frame section displaces the rod along the longitudinal axis thereof. The rod has a cam on the opposite end thereof which engages a plurality of cam-actuatable switches as the rod is displaced along its longitudinal axis during articulation of the frame. Engagement of the switch by the cam, sends an electrical signal to be used in a circuit comprising part of the present invention. The placement of each cam-actuatable switch relative to the cam of the rod, determines the angle of articulation of the frame that will be sensed by this particular embodiment of the articulation sensing means. Thus, the articulation sensing means performs a step-wise sensing function.

The multi-outlet valve control circuit further comprises articulation pressure adjustment means to vary the pressure in the sacks of each support zone, according to the degree of articulation sensed by the articulation sensing means. The articulation pressure adjustment means preferably comprises a plurality of preset variable resistors and an integrated circuit communicating with the articulation sensing means and selecting one of the preset variable resistors according to the degree of articulation determined by the articulation sensing means.

The accompanying drawings, which are incorporated in and constitute a part of this specification, illustrate one embodiment of the invention and, together with the description, serve to explain the principles of the invention. However, the invention is not limited to the specific embodiments illustrated in the drawings, which now are briefly described.

BRIEF DESCRIPTION OF THE DRAWINGS

FIG. 6 is a detailed cross-section of components of an embodiment of the present invention shown in FIG. 5, with a connected condition indicated in phantom;

FIG. 7 is a cross-sectional view of components of an embodiment of the present invention;

FIG. 8*a* is a top plan view taken along the VIIIa—VIIIa of FIG. 7;

FIG. 8*b* is a top plan view taken along the lines VIIIb—VIIIb of FIG. 7;

DESCRIPTION OF THE PREFERRED EMBODIMENTS

Reference will now be made in detail to the present preferred embodiments of the invention, examples of which are illustrated in the accompanying drawings.

The improved patient support structure of the invention comprises a frame which is capable of being elevated and articulated. In the embodiment of the invention shown in FIG. 1, the frame is designated generally by the numeral 30 and comprises a plurality of connected rigid members of a conventional articulatable hospital bed frame. Conventional means are provided for rendering the frame articulatable and for powering the movement of the articulatable sections of the frame. As is conventional, each articulatable section defines a joint 32 (FIGS. 3 and 4) for articulating movement thereabout by each articulatable section. A suitable frame is manufactured by Hill Rom of Batesville, Ind. Preferably, the frame comprises three sub-frames, including a lower frame, a mid-frame and an upper frame, the latter designated generally by the numeral 34 in FIGS. 2, 3 and 13. The lower frame preferably comprises four members formed in a rectangle, and rests on four swiveling wheels. One wheel is received within the lower frame at each corner thereof. At least one middle support brace extends between the two side members of the lower frame to provide additional structural support.

Figure 1:
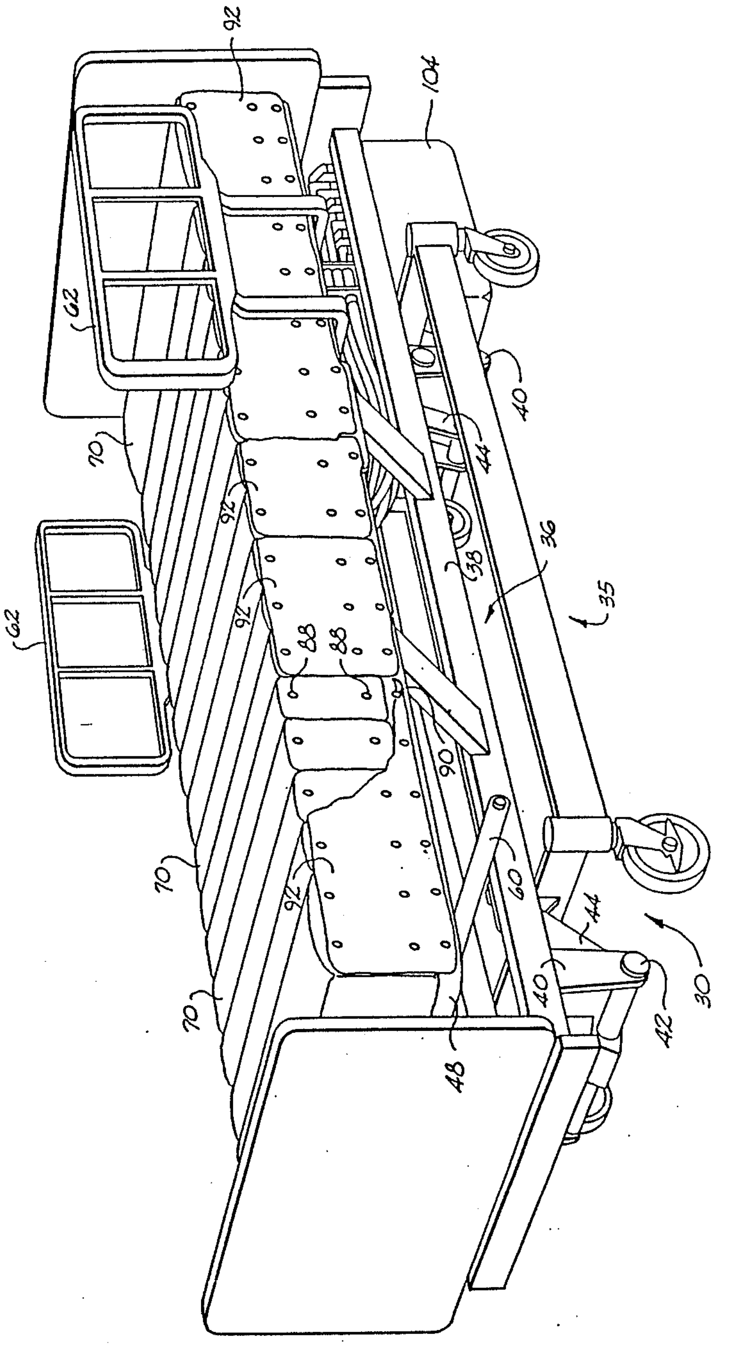
FIG. 1 is a side elevation view of an embodiment of the invention.

As shown in FIG. 1, the frame further comprises a mid-frame 36, which also is rectangular and formed by side bars connected to two end bars. Four side struts 40 depend from the mid-frame and have at their free ends provision for holding the ends of an axle 42 which extends between two opposed side struts 40. Four elevation struts 44 are provided with one end of each elevation strut pivotally attached to the shaft and the other end of each elevation strut pivotally attached to a mounting on the lower frame.

Figure 2:
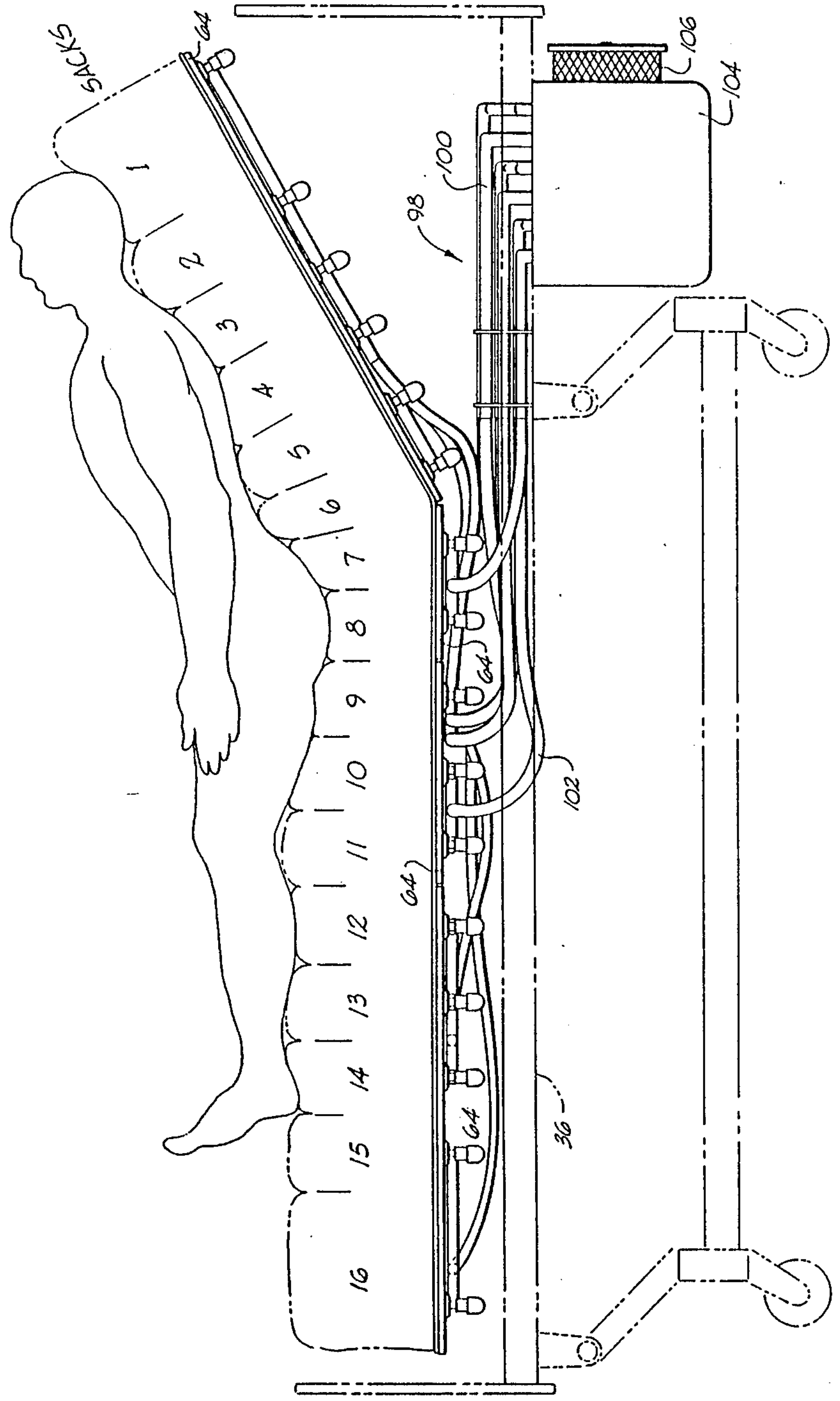
FIG. 2 is a side elevational view of components of an embodiment of the present invention with parts of the frame indicated in phantom.
Figure 3:
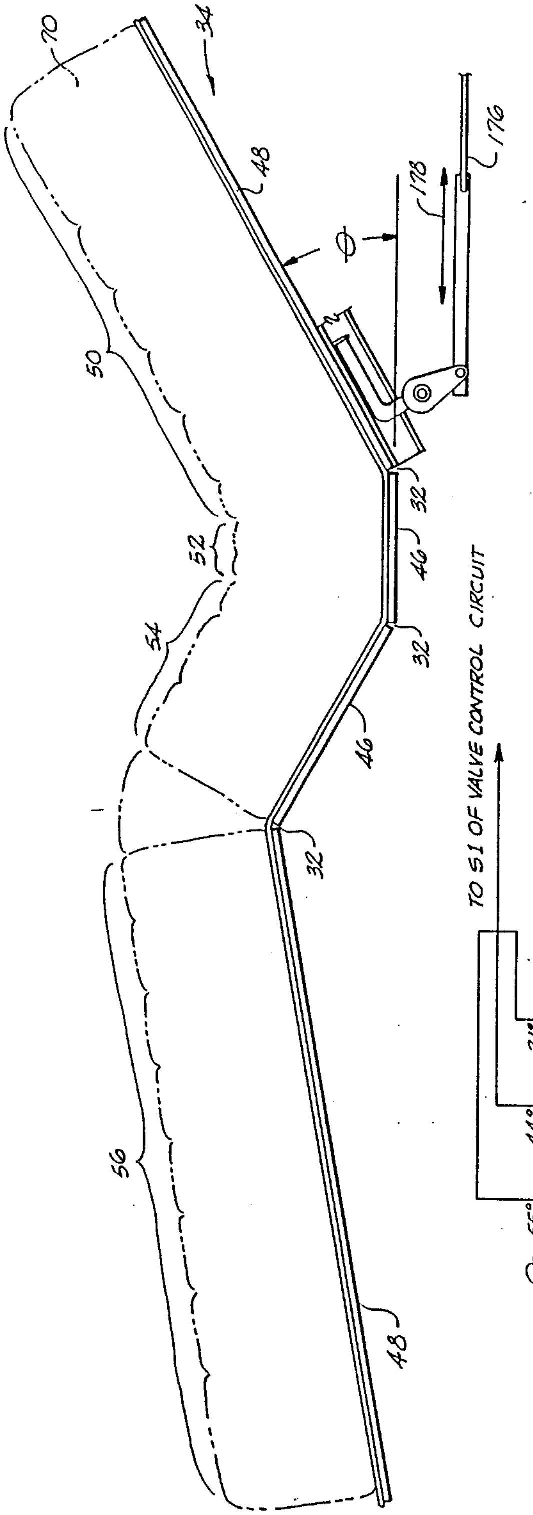
FIG. 3 is a schematic view of components of an embodiment of the present invention.

As shown in FIGS. 2–6 and 13, the frame also includes an upper frame member 34, which measures approximately 7 feet by 3 feet and is preferably defined by a plurality of side angle irons 46 and a pair of C-shaped angle irons 48 at opposite ends of the upper frame member. The number of side angle irons comprising the upper frame member is dependent upon the number of articulatable sections to be provided in the support structure. Preferably, as shown in FIG. 3, the upper frame includes a head section, a seat section, a thigh section, and a calf section. A pair of side angle irons are aligned opposite each other to define the seat section of the upper frame. Similarly, another pair of side angle irons are aligned opposite one another to define the thigh section of the upper frame. One of the C-shaped angle irons at one end of the upper frame defines the head section, while the other C-shaped angle defines the calf or foot section. The lower frame generally 35 preferably comprises four members formed in a rectangle, and rests on four swiveling wheels. One wheel is received within the lower frame at each corner thereof. At least one middle support brace extends between the two side members of the lower frame to provide additional structural support.

As shown in FIG. 1, the frame further comprises a mid-frame 36, which also is rectangular and formed by side bars connected to two end bars. Four side struts 40 depend from the mid-frame and have at their free ends provision for holding the ends of an axle 42 which extends between two opposed side struts 40. Four elevation struts 44 are provided with one end of each elevation strut pivotally attached to the shaft and the other end of each elevation strut pivotally attached to a mounting on the lower frame.

Figure 4:
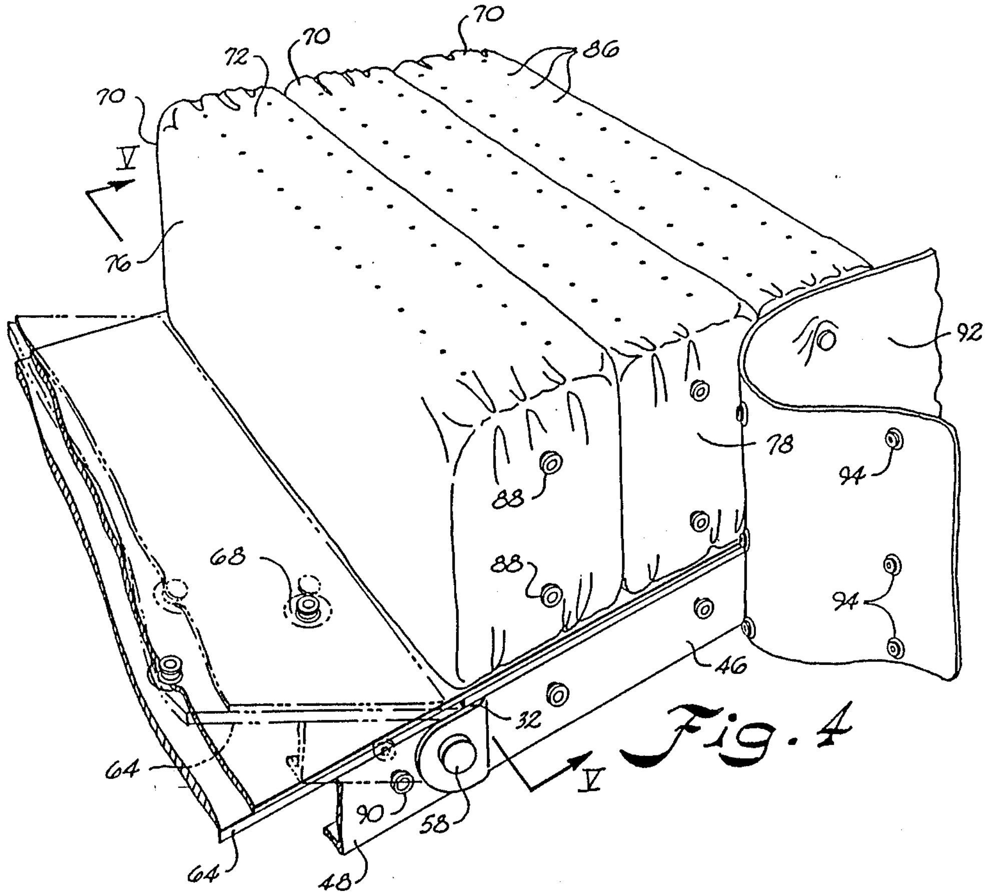
FIG. 4 is a partial perspective view of components of an embodiment of the present invention.

As shown in FIG. 4, the side angle irons are connected to the C-shaped angle irons and to one another by pivoting connections at joints 32. For example, a bearing (not shown) is received within an opening (not shown) at opposite ends of the side angle iron, the bearing carrying a journal 58 to permit pivoting movement between adjacent angle iron members.

As shown in FIG. 1, the upper frame is connected to the mid-frame by a plurality of depending struts 60 which are pivotally mounted at their opposite ends to one of the mid-frame or the upper frame. The frame members can be formed from any sturdy material such as 11 guage steel.

As shown in FIG. 1, the frame also may include a plurality of side guard rails 62. Guard rails 62 may be vertically adjustable and may be movable from one end of the frame to the other end. Moreover, conventional releasable means (not shown) can be provided for guard rails 62 to permit quick and easy lowering and storage of same.

In accordance with the present invention, the frame has a planar upper surface defining a plurality of openings therein. As embodied herein and shown for example in FIGS. 2 and 4–6, upper frame 34 preferably comprises a plurality of flat plates 64 extending between opposed angle irons 46, 48, to provide a planar upper surface for each articulatable section of upper frame 34. The flat plates preferably are attached to the angle irons by conventional mechanical fastening means, such as screws.

In another embodiment (not shown), the upper frame member can comprise an integral member having a planar upper surface and having side members depending therefrom and integral therewith. This alternative embodiment eliminates the need for the fastening means used to attach plates 64 to angle irons 46, 48.

Figure 5:
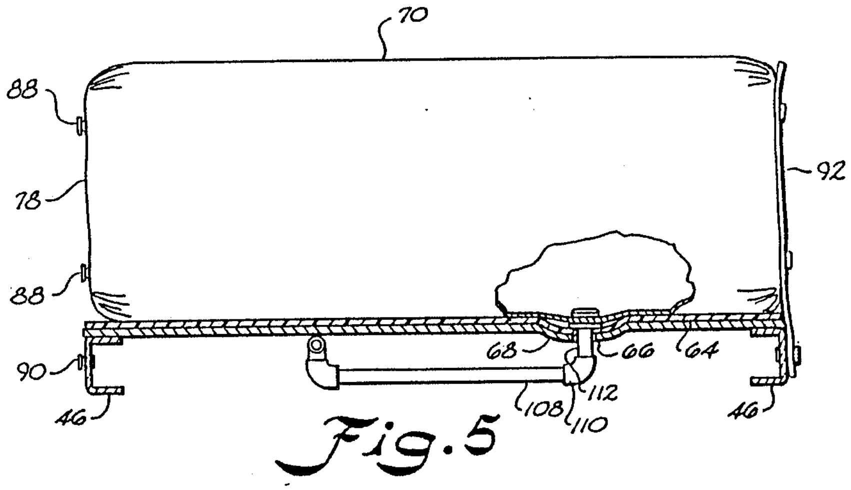
FIG. 5 is a cross section of the view taken along the lines V—V of FIG. 4.

In the embodiment shown in FIGS. 5 and 6, each plate defining the upper surface of the frame, preferably comprises a plurality of openings 66 for allowing passage therethrough of gas supply means, which carries the gas supplied to each sack. In further accordance with the present invention, each plate opening 66 has a depressed portion 68 formed therearound.

As shown in FIGS. 1–5, 11 and 13, the improved patient support structure of the present invention also includes a plurality of elongated inflatable sacks 70. When inflated, the sacks are formed into a generally rectangular box shape as shown in FIGS. 1 and 4. Each sack has a top wall 72 opposed to a bottom wall 74, two opposed side walls 76, and two opposed end walls 78. Each of the sack walls is preferably integrally formed of the same material, which should be gas-tight and capable of being heat sealed and laundered. Preferably, the sack walls are formed of twill woven nylon which is coated with urethane on the wall surface forming the interior of the sack. The thickness of the urethane coating is in the range of three ten thousandths of an inch to two thousandths of an inch. Vinyl or nylon coated with vinyl also would be a suitable material for the sack walls. If the material comprising the sacks is disposable, then the material need not be capable of being laundered.

Each sack has an inlet opening 80 (FIG. 6), which is preferably located approximately 14 inches from one end wall 78 thereof and generally centered along the longitudinal center line of the bottom wall. As shown in FIG. 6, an adaptor comprising a sealing ring 82 is formed around the inlet opening and is sealably attached thereto, as by chemical adhesive. Sealing ring 82 preferably is formed of rubber or flexible plastic, for forming a gas-tight seal when received by a mating connector means. Sealing ring 82 preferably is molded with a thin annular disk 84 extending from its outer centroidial axis. Disk 84 facilitates heat sealing of ring 82 to the inlet portion of bottom wall 74 of sack 70.

A plurality of small diameter gas exhaust holes 86 (FIG. 4) are formed along the top wall of each sack near the perimeter thereof and close to the adjacent perimeter of the corresponding side wall. Preferably a total of 26 holes are provided in each top wall of each sack, and the diameter of the holes is preferably 50 thousandths of an inch, but can be in the range of between 18 thousandths of an inch to 90 thousandths of an inch. The actual size depends on the number of holes provided, and on the outward air flow desired.

The number of sacks can be varied depending on a number of factors, including the size of the support structure. However, as shown in FIG. 2, preferably, sixteen individual sacks are provided atop the frame, and the two sacks at the opposite ends of the sixteen, are approximately twice as wide as the other fourteen sacks. Accordingly, each of the end sacks contains twice the volume of gas as each smaller sack. Each smaller sack preferably measures 36 inches by 4.5 inches by 10 inches, and each larger sack preferably measures 36 inches by 9 inches by 10 inches. The top wall of each sack is approximately 36 inches in length. The top wall of each smaller sack is about 4.5 inches in width. The top wall is about 9 inches in width for each of the two larger end sacks. The end walls of each sack are preferably approximately 10 inches in height, and the preferred height range for the sacks is between 8 inches and 13 inches.

In accordance with the present invention, each end wall of each sack is provided with upper and lower attachment means. As embodied herein and shown for example in FIGS. 1, 4 and 5, the attachment means preferably comprises two snap members 88 on the ends of the smaller sacks and four snap members on the ends of the larger sacks. The upper snap members comprise the upper attachment means, and the lower snap members comprise the lower attachment means.

Similarly, in further accordance with the present invention, frame attachment means are provided and are located on the frame near the end walls of the sacks. As embodied herein and shown for example in FIGS. 1, 4 and 5, the frame attachment means preferably comprise a plurality of snap members 90 located along angle irons 46, 48 of upper frame member 34 and positioned generally in alignment with upper and lower snap members 88 on end walls 78 of sacks 70 disposed atop the upper frame member.

Figure 12:
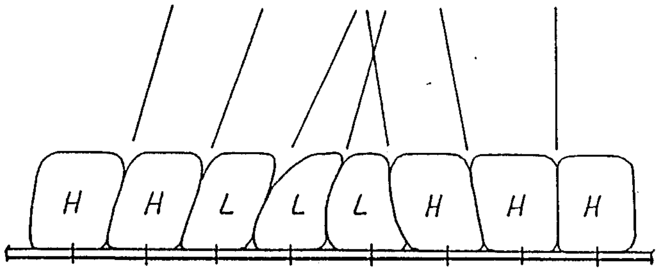
Fig. 12 (PRIOR ART)
FIG. 12 is a side elevational view of a conventional arrangement of air cells of differing pressures in a patient support structure.

FIG. 12 illustrates an undesirable result, known as "rotation," that pertains to conventional inflatable bed structures in which adjacent inflatable sacks are maintained at different pressure levels and are attached to the underlying rigid support structure by a single attachment means generally associated with the lower portion of the sack. The sacks maintained at the higher pressure levels tend to squeeze against the sacks maintained at the lower pressure levels to cause the undesirable rotation effect. One undesirable result of rotation is the destruction of a continuous and uniform support structure for the patient. The non-uniform support structure provides sites for pressure points against the body of the patient. These pressure points eventually cause bed sores to develop on the patient.

In accordance with the improved patient support structure of the present invention, there is provided sack retaining means for retaining the sacks in a disposition when inflated such that side walls of same are generally vertically oriented, with side walls of adjacent sacks being in contact along at least a significant portion of the heights of same. In further accordance with the present invention, the retaining means has attachment means thereon matable with the upper and lower sack attachment means for removable securement of the sacks thereto. In still further accordance with the present invention, the retaining means attachment means also is matable with the frame attachment means. Attachment of the retaining means attachment means to the upper and lower sack attachment means and to the frame attachment means, generally maintains the inflated sacks in their generally vertically oriented disposition irrespective of pressure variances between the sacks. As embodied herein and shown for example in FIGS. 1, 4, 5 and 13, the retaining means of the present invention preferably comprises a plurality of panels 92, each panel 92 having a width corresponding generally to the height of the end walls of the sacks and having a length corresponding to a whole number multiple of the width of an end wall of a smaller sack. The length of each panel preferably corresponds to the length of each articulatable frame section to which the panel is to be attached. Each panel 92 is formed preferably of material similar to the material used to form the sacks and has on one side thereof attachment means matable with upper and lower sack snap members 88 and frame snap members 90, as shown in FIGS. 1 and 4. A panel 92 preferably is attached to each end wall of the sacks resting atop a particular articulatable section.

Figure 13:
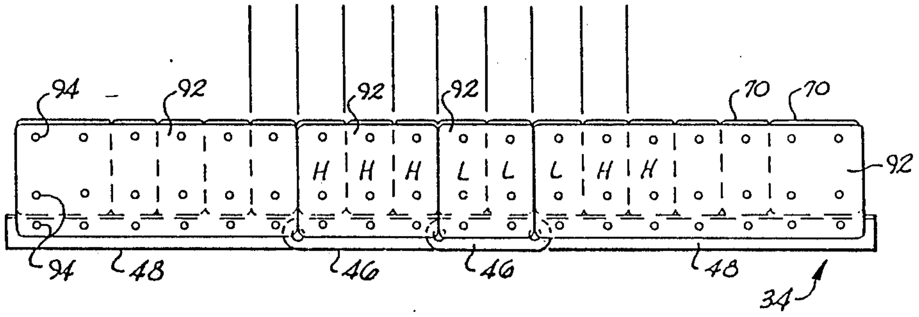
FIG. 13 is a side elevational view of components of an embodiment of the present invention.

Preferably, the attachment means of the retaining means comprises a plurality of snap members 94 which are matable with the snap members mounted on the sides of the angle irons of the upper frame and with the snap members mounted on the end walls of the sacks. As shown in FIG. 13, the sacks are arranged so that the vertical axes extending along the outer edge of each end wall are maintained in a substantially parallel relation to each other and to the vertical axes of the adjacent sack. This condition pertains to the sacks when the frame is in an unarticulated condition, i.e., all in one plane, or to only those sacks atop one of the articulatable sections of the upper frame member. This condition also is illustrated in FIG. 2 with the retaining means panels removed from view.

The improved patient support structure of the present invention comprises gas supply means in communication with each of the sacks, for supplying gas to same. As embodied herein, the gas supply means preferably comprises a variable speed air blower 96 (FIGS. 9–11 and 17) and a plurality of gas pipes 98, (FIG. 2) comprising a supply network for carrying air from blower 96, which compresses and pumps the air through pipes 98 to individual sacks 70. As shown in FIG. 2, the piping comprising the gas supply means includes rigid plastic piping 100, such as PVC pipes, and flexible plastic hoses 102, such as polyvinyl tubing. Blower 96 is preferably contained in a sealed housing 104 (FIGS. 1, 2, 10 and 11) having an air inlet, which is provided with a filter 106 (FIGS. 2 and 10 (phantom)) that removes particulate impurities from the air that is pumped to sacks 70.

Preferably, the air blower comprises an industry standard size three blower, such as manufactured by Fugi Electric. The blower provides an air flow of 50 cubic feet per minute, without back pressure, and is capable of generating a maximum pressure of about 30 inches of water. The blower preferably runs on a single phase voltage supply and draws about 4 amperes of current in performing its function for the present invention.

In further accordance with the present invention, the gas supply means includes an individual gas conduit means for each sack. In the embodiment shown in FIGS. 5 and 6 for example, the gas conduit means preferably comprises about an eight inch length of nominal.. one half inch polyethelene tubing 108. One end of tubing 108 is connected to and forms a gas impervious seal with a polyvinylchloride (PVC) elbow joint 110. The other end of pVC elbow joint 110 is connected to a short length of PVC piping 112 and forms a gas impervious seal therewith. This small length of piping extends through an upper surface opening 66 in flat plates 64. The other end of the small length of piping has a conduit connector means which is matable with adaptor 82 of sack 70. In the detailed drawing of the embodiment shown in FIG. 6, the conduit connector means is integrally defined at one end of the small length of pipe and forms a "male" connection member 114. Similarly, sealing ring 82 shown in FIG. 6 forms a "female" connection member which matably receives male connection member therein. Alternatively, a "male" connection member 114 can be substituted for sealing ring 82, and the conduit connector means can comprise a matable "female" connection member, as desired. Sealing ring member 82 stretches to fit over a lip 116 of male connection member 114 and is received in an annular groove 118 underneath lip 116 of member 114 to form a gas impervious seal between sealing ring 82 and the conduit connector means.

Each sack is easily disconnected from the conduit connector means because of the flexibility of the polyethelene tubing forming the individual gas conduit means for each sack. The flexible polyethelene tubing bends easily to accommodate upward pulling on the sack to permit displacement of the connected sealing ring and conduit connector means from the depressed portion surrounding each opening in the planar surface frame and each membrane opening coincident therewith. The flexibility of the polyethelene pipe allows a sufficient range of movement of the sack from the upper surface of the frame to permit easy access to and manipulation of, the connection between the sealing ring and the conduit connector means.

In further accordance with the present invention, and as shown in FIGS. 5 and 6 for example, the connector means 114 is freely received in depressed portion 68 formed in the planar upper surface of upper frame member 34 around opening 66. Preferably, when adaptor 82 and the conduit connector means 114 are connected to form a gas impervious seal, the connected structure (shown in FIG. 5) is completely received within depressed portion 68. In this way, no structure protrudes above the height of depressed portion 68 where any such structure otherwise might cause potential discomfort to a patient resting atop the deflated sacks. Such deflated sack condition might become necessary to perform an emergency medical procedure such as cardiopulminary resusitation (CPR). Thus, the patient is protected from contact with the fittings used to connect the sacks with the gas supply means and accordingly is safeguarded against any harm or discomfort that might result from such contact.

In accordance with the improved patient support structure of the present invention, there is provided a flexible fluid impervious membrane received atop the upper planar surface of the frame and extending across the upper planar surface at least in the vicinity of each joint of each articulatable section of the frame. As embodied herein and shown for example in FIGS. 4–6, the flexible, fluid impervious membrane of the present invention comprises a sheet 120 of neoprene or other flexible fluid impervious material mounted atop plates 64 and fastened thereto as by application of a chemical adhesive. The membrane of the present invention provides a smooth cleanable surface that catches any fluid discharge from the patient and prevents same from soiling other parts of the patient support structure and the hospital room floor. The membrane further prevents pinching in the vicinity of each joint 32 of each articulatable section of the upper surface of the frame. Thus, any sacks disposed in the vicinity of each joint will be prevented from being pinched. Moreover, when the sacks are deflated, for example when performing CPR, the membrane prevents the patient from being pinched in the vicinity of the joints of articulatable sections of the frame.

In the embodiment shown in FIGS. 4–6, the membrane defines a plurality of openings 122 therethrough. Membrane openings 122 are coincident with openings 66 in the planar upper surface of the frame. Each membrane opening is slightly undersized relative to openings 66 so that any gas conduit member passing through an opening will accordingly be oversized relative to the coincident membrane opening, and therefore a fluid impervious sal will be formed between the membrane and any conduit connector means or other connecting member passing through membrane opening 122. In an embodiment (not shown) of the patient support structure in which the inflatable sacks have inlets on the side walls for example, there would be no need for any opening in either the upper planar surface of the frame or the membrane.

In accordance with the present invention, there is provided control means associated with the gas supply means and the sacks, for controlling supply of gas to each of the sacks according to predetermined zonal combinations of the sacks and according to a predetermined pressure profile across the plurality of sacks, each combination of sacks defining a separate support zone. As embodied herein, the control means preferably includes a variable autotransformer 124 (FIG. 17); an autotransformer adjustment motor 126 mechanically connected to autotransformer 124; an autotransformer control circuit 128 (FIGS. 14 and 17) for automatically actuating motor 126 according to predetermined operating parameters for blower 96; a multi-outlet, variable flow, gas valve 130 (FIGS. 7, 9 and 10); and a valve control circuit 132 (FIG. 15) for automatically controlling the valve settings for the multi-outlet, variable flow, gas valve, according to predetermined pressure parameters for the sacks.

Figure 17:
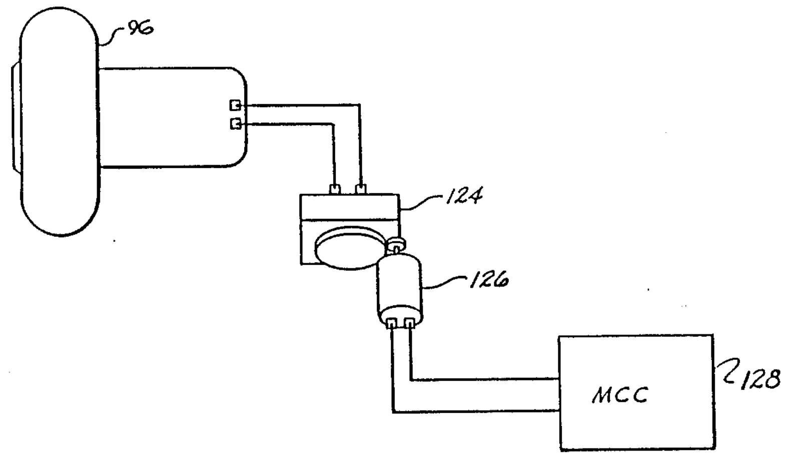
FIG. 17 is a schematic of components of an embodiment of the present invention.

The blower speed preferably is infinitely variable and is controlled by an autotransformer 124, as shown schematically in FIG. 17. A DC motor 126 is preferably mechanically connected to the autotransformer to adjust same over the range of its variable voltage output. Motor 126 is controlled by an electronic autotransformer control circuit 128 (to be described hereinafter).

The blower preferably operates over a range of speeds, which vary depending on the voltage supplied to the blower The blower operates at the lowest practical speed when the autotransformer is set at 60 volts, and at the highest practical speed when the autotransformer is set at 117 volts. At the lowest practical speed, the air blower generates sufficient pressure to maintain each of the bags at a maximum pressure of approximately 4.0 inches of water. At the highest practical speed of the blower, the bags are maintained at a maximum pressure of approximately 11 inches of water.

Figure 14:
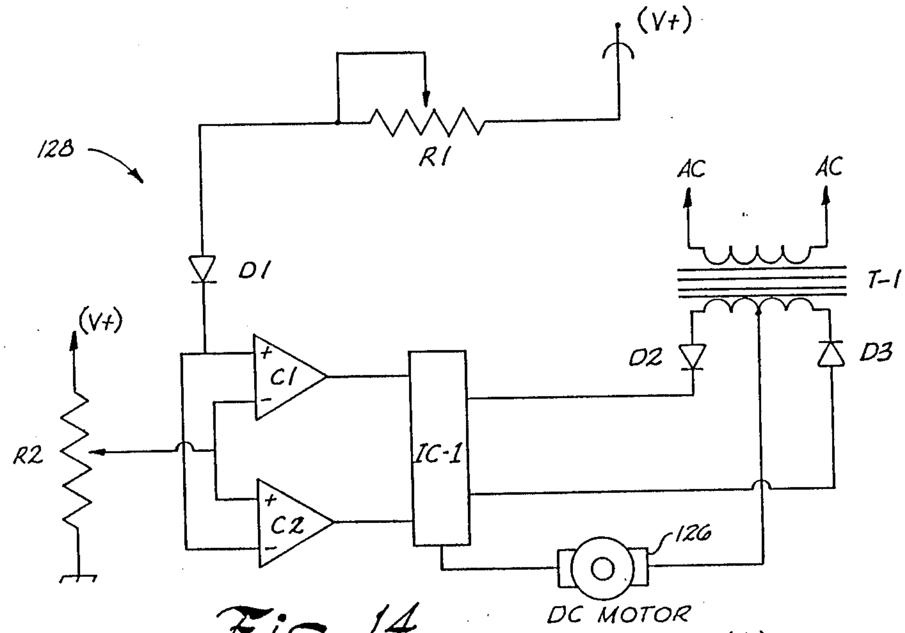
FIG. 14 is a schematic of components of an embodiment of the present invention.

In accordance with the present invention, the control means comprises an autotransformer control circuit for automatically actuating the motor connected to the autotransformer, according to predetermined operating parameters for the blower. As embodied herein and shown for example in FIG. 14, the autotransformer control circuit is generally designated by the numeral 128 and comprises a variable resistor R1 through which a reference voltage V+ is passed. Variable resistor R1 preferably comprises a potentiometer which is housed in a control box 134, such as the control box shown in FIG. 16, in a manner accessible only to service personnel and not to the patient or medical personnel attending the patient. Variable resistor R1 is connected to a diode element D1, which passes the signal from R1 to the inputs of comparators C1 and C2. As shown in FIG. 14, the signal from R1 is provided to the plus side input of comparator C1 and the minus side input of comparator C2. A second voltage signal is derived from another variable resistor R2, which signal also is applied to the other input of each of comparators C1 and C2. As shown in FIG. 14, the signal from R2 is provided to the minus side input of comparator C1 and the plus side input of comparator C2. Preferably, comparators C1 and C2 are type "339" integrated circuits or similar comparators. In operation, each comparator compares the voltage at its plus and minus input terminals and produces a "high" or "low" output according to the well known rules of the comparator's operation. Typically, zero volts constitutes the low output of a comparator, and approximately the supply voltage constitutes the high output of a comparator.

As shown in FIG. 14, comparators C1 and C2 provide their output to a first integrated circuit IC1, which is "hard-wired" to yield an output depending upon whether the outputs received from comparators C1 and C2 are either high and low, or low and high, respectively. For example, if C1 sends a high output to integrated circuit IC1, then C2 will have sent a low output to integrated circuit IC1, and integrated circuit IC1 will connect DC motor 126, which is mechanically connected to autotransformer 144 (FIG. 17), via a second diode D2, to the AC power supply. Thus, the motor will be driven by a half wave direct current, which will cause motor 126 to rotate in a given direction, either clockwise or counterclockwise. Alternatively, if comparator C1 output is low, then comparator C2 output will be high, and integrated circuit IC1 will connect motor 126 via a third diode D3, such that the resulting half wave direct current causes the motor to rotate in a direction opposite the previous direction. Rotation of motor 126 varies the voltage output setting of the autotransformer, an also turns variable resistor R2, as shown schematically in FIG. 14. This causes a reference feedback voltage to be supplied comparators C1 and C2 and thereby indicates the present blower speed.

In operation, the autotransformer control circuit runs DC motor 126, and in turn adjusts the autotransformer voltage setting, as long as the reference voltage across variable resistor R2 differs from the voltage coming from variable resistor R1. When the voltage at the reference output of variable resistor R2 is essentially equal to the preset voltage arriving at the comparators through variable resistor R1, then the control circuit ceases supplying power to the motor, and the autotransformer voltage output setting remains constant. Accordingly, the blower speed remains constant. DC motor 126 will continue to rotate, in either direction, until the preset voltage of variable resistor R1 balances the reference voltage provided to the output terminal of variable resistor R2.

In practice, a technician would preset variable resistor R1 depending upon the weight characteristic of the patient to be supported on the support structure of the present invention. The heavier patient would require greater sack pressure, and accordingly a higher blower speed would be required. The higher blower speed would mean that the motor needs to set the autotransformer at a higher voltage setting. Accordingly, the R1 would be preset so that the R1/R2 balance is attained at a relatively high autotransformer output voltage setting.

In accordance with the control means of the present invention, there is provided a multi-outlet, variable flow, gas valve, comprising: a housing defining an inlet and a passageway, the inlet communicating with the passageway; at least two cylinder chambers defined within the housing and communicating with the passageway; a discrete outlet defined within the housing for each of the cylinder chambers and communicating therewith; and means for variably controlling communication of the passageway with the outlet through the cylinder chamber. As embodied herein and shown for example in FIGS. 7–10, a housing 136 defines a passageway 138 extending along the length thereof. Housing 136 further defines an inlet 140 (FIG. 9) communicating with passageway 138. In the multi-outlet valve, housing 136 further defines at least two cylinder chambers 142 communicating with passageway 138. A discrete outlet 144 is defined in housing 136 for each cylinder chamber and communicates with that cylinder chamber. However, the invention encompasses a single outlet embodiment in which the housing defines only one cylinder chamber and one outlet therefor. The description of the multi-outlet embodiment pertains to the singe outlet embodiment in all respects save the number of cylinder chambers and outlets in communication with the inlet and passageway and the number of associated pistons, rotatable shafts, potentiometers, etc. described below.

Figure 9:
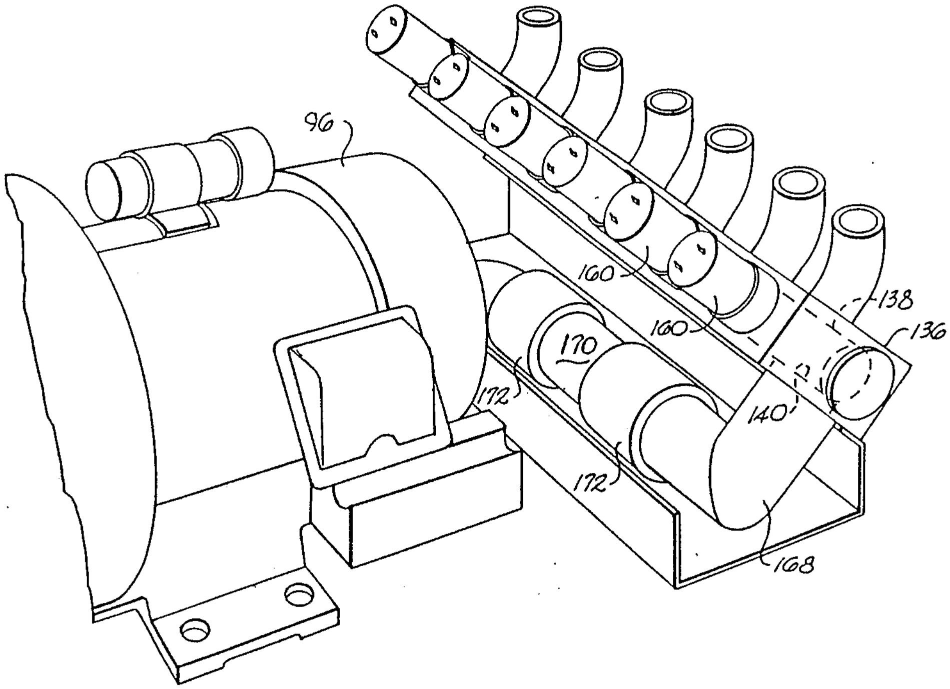
FIG. 9 is a perspective view of components of an embodiment of the present invention.
Figure 10:
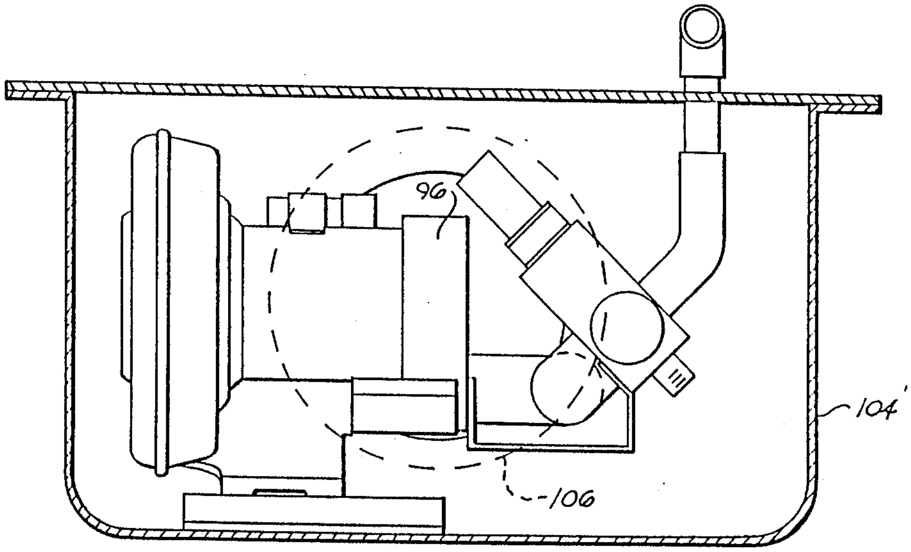
FIG. 10 is a side plan view of components of an embodiment of the present invention.

Preferably, and as shown in the embodiment depicted in FIG. 9, housing 136 defines six separate cylinder chambers and six outlets therefor, of the type shown in FIG. 7. This is because there are six so-called support zones in the preferred embodiment of the support structure of the present invention. Each support zone requires its own valve so that the support zone pressure can be maintained independently from the pressure in other support zones.

In further accordance with the multi-outlet variable gas flow valve of the present invention, there is provided means for variably controlling communication of the passageway with the outlet through the cylinder chamber. As embodied herein and shown for example in FIG. 7, the variable communication control means comprises a plurality of pistons 146. One piston is provided for each cylinder chamber and is slidably received therein such that passage of gas flow between the wall of cylinder chamber 142 and the piston is substantially prevented. Piston 146 blocks all communication between outlet 144 and passageway 138, when piston 146 is oriented at at least one predetermined location within cylinder chamber 142. Piston 146 permits complete communication between the outlet and the passageway through cylinder chamber, when the piston is oriented at another predetermined location within the cylinder chamber. Piston 146 permits a predetermined degree of communication between the outlet and the passageway through cylinder chamber 146 depending upon the orientation of piston 146 within cylinder chamber 142.

The variable communication control means further comprises means for orienting the piston at a predetermined location within the cylinder chamber. As embodied herein and shown for example in FIG. 7, the means for orienting the piston at a predetermined location preferably comprises a threaded opening 148 extending through piston 146 and concentric with the longitudinal center line of the piston. The orienting means further preferably comprises a rotatable shaft 150 having a threaded exterior portion 152 engaging threaded opening 148 of piston 146.

In accordance with the present invention, the piston orienting means further comprises means for precluding full rotation of the piston. As embodied herein and shown for example in FIG. 7, the means for precluding full rotation of the piston preferably comprises a projection 154 associated therewith having a free end extending into the outlet of the housing. Projection 154 can be integrally formed as part of piston 146 or can be a structure attachable thereto. Preferably, and as shown in FIGS. **8*a* and 8*b*, projection 154 extends into an elongated-shaped opening 156 defined in housing 136 between outlet 144 and cylinder chamber 142**.

The piston orienting means further comprises means for rotating the shaft whereby rotation of the shaft causes displacement of the piston along the shaft in the cylinder chamber. The direction of this piston displacement depends upon the direction of rotation of the shaft. As embodied herein and shown for example in FIG. 7, the shaft rotation means preferably comprises a DC electric motor 160, such as one which permits adequate control over rotation of the shaft to control displacement of the piston therealong. Motor 160 is attached to one end of shaft 150, and accordingly, rotation of motor 160 results in rotation of shaft 150 attached thereto. Motor 160 can communicate with shaft 150 via a reduction gear box, if desired for finer control.

The multi-outlet, variable flow, gas valve still further comprises a flow restriction means which is received within the outlet defined in the housing. As embodied herein and shown for example in FIGS. 8*a* and 8*b*, an embodiment of the flow restriction means preferably comprises an elongated-shaped opening 156 defined in valve housing 136 between the outlet and the cylinder chamber. The longitudinal axis of opening 156 is preferably oriented parallel to the longitudinal axis of the cylinder chamber and the shaft.

In operation, the projection prevents the piston from rotating outside of the confines of the outlet, and preferably the elongated-shaped opening. Motor 160 rotates and drives the shaft in rotational movement therewith. Since, the piston cannot rotate in conjunction with shaft because of projection 154, piston 146 screws up and down threaded exterior portion 152 of shaft 150 and accordingly repositions itself at different locations inside cylinder chamber 142.

The multi-outlet, variable flow, gas valve further comprises means for indicating the degree of communication between the outlet and the passageway that is being permitted by the piston. As embodied herein and shown for example in FIG. 7, the degree of communication indicating means comprises a potentiometer 162 having a rotatable axle 164 attached to the end of the shaft opposite the end attached to the motor. Rotation of axle 164 by shaft 150 varies the voltage output of the potentiometer depending upon the number of rotations of the shaft. Since each shaft rotation moves piston 146 a predetermined distance inside cylinder chamber 142, the voltage output of potentiometer 162 correlates with the flow being permitted to pass through the valve by piston 146. Potentiometer 162 preferably comprises a ten kilo-ohm, ten turn potentiometer having an axle adaptable for attachment to a shaft.

Figure 11:
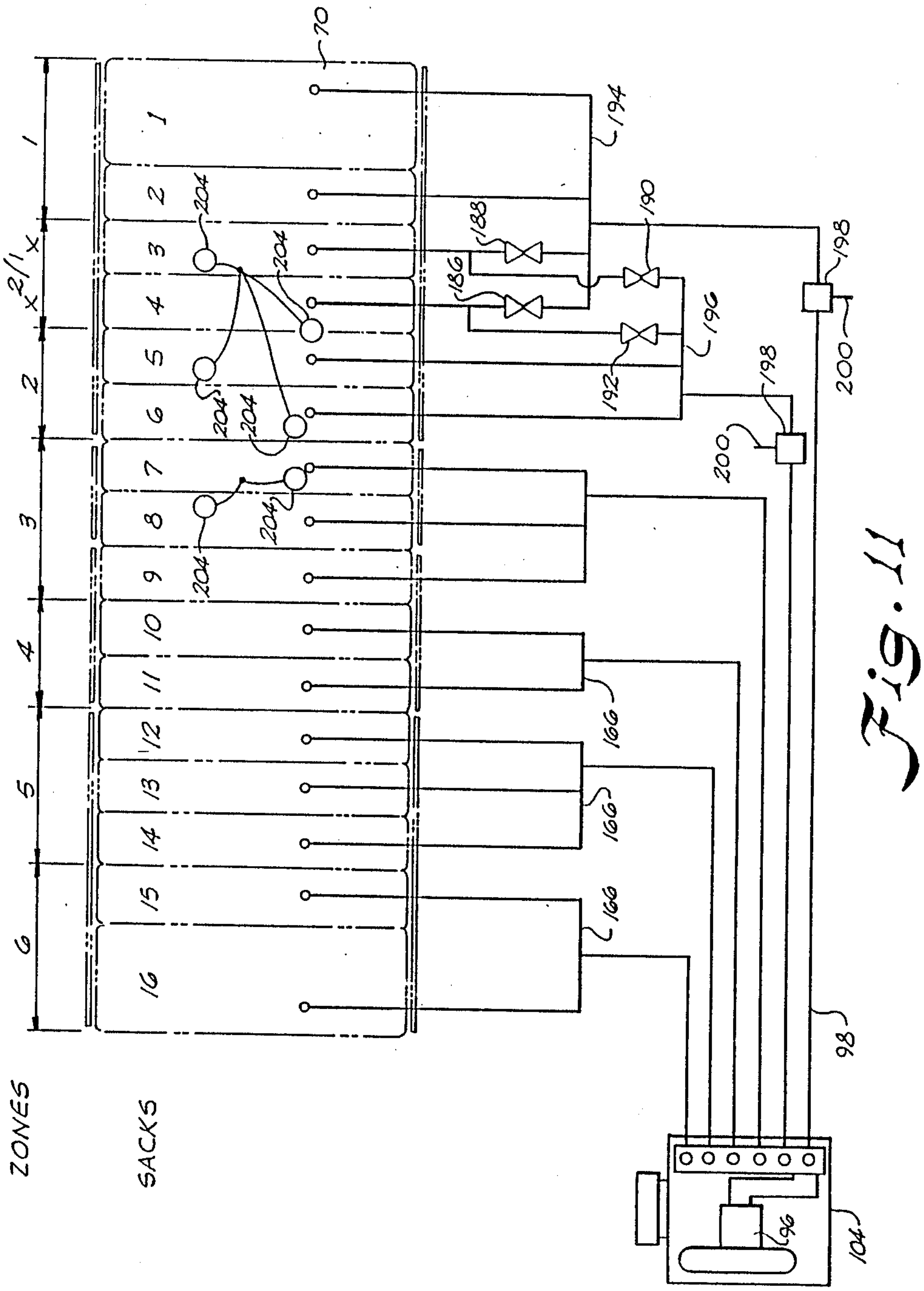
FIG. 11 is a schematic view of components of an embodiment of the present invention.

As shown in FIGS. 11 and 13, the sixteen sacks preferably comprising the illustrated embodiment of the present invention are nominally allocated into six separate patient support zones, designated zone one, zone two, etc. For ease of reference, the section of the patient support structure which normally supports the patient's head is designated zone one, and the portion of the patient support structure which supports the patient's feet is designated zone six. Zones two, three, four and five follow in order between zones one and six. Zone six comprises one smaller sack and one larger sack. Each of zones five and three comprises three smaller sacks-. Zone four comprises two smaller sacks. Zone two alternatively comprises either two, three or four smaller sacks. Zone one comprises one larger sack and alternatively either one, two or three smaller sacks.

As shown in FIG. 11, the sacks comprising each individual support zone are connected via a respective individual conduit means to a manifold 166 having a number of outlets appropriate to the number of sacks in that particular support zone. The manifold has a single inlet which is connected via the piping comprising the gas supply means of the present invention, to an outlet of one of the individual valves comprising the multi-outlet, variable flow, gas valve of the present invention.

As shown in FIG. 9, the air blower conveys compressed air through a duct 168 having an electric heater element (not shown) therein to heat the compressed air, when desired. The duct preferably is connected to inlet 140 of the multi-outlet, variable flow, gas valve and comprises a plurality of metal tube sections 170 connected via a plurality of soft plastic sleeves 172. The heated compressed air travels into passageway 138 (FIG. 7) and is distributed through the respective cylinder chambers and outlets of the individual valve sections comprising the multi-outlet valve of the invention, depending upon the location of the pistons associated therewith. Each valve motor 160 (FIG. 9) can be operated to adjust the position of each piston and accordingly affect the air flow distribution exiting through the outlet and elongated-shaped opening associated therewith. At any given blower speed, determined as described above by presetting variable resistor R1, the air flow distribution, and accordingly the pressure provided in each of the six support zones, can be varied depending upon the setting of each piston location inside each respective cylinder chamber. The manner in which the pressure level for each zone is preset and automatically maintained at the preset pressure, now will be described.

In further accordance with the control means of the present invention, there is provided a valve control circuit for automatically controlling the valve settings for the multi-outlet, variable flow, gas valve, according to predetermined pressure parameters for the sacks. As embodied herein, the valve control circuit preferably comprises an electronic circuit shown schematically in FIG. 15, and generally designated by the numeral 174.

Figure 15:
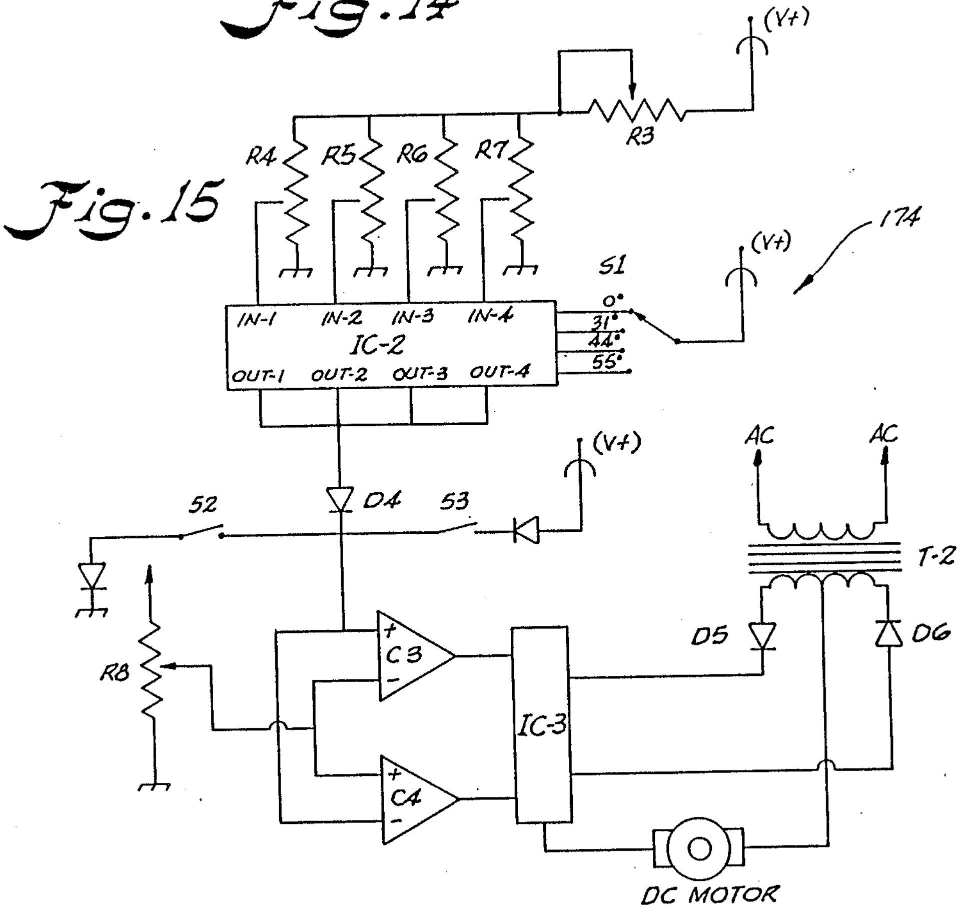
FIG. 15 is a schematic of components of an embodiment of the present invention.

A valve control circuit similar to the one depicted in FIG. 15, is used to control each of the six valves which is associated with one of the six support zones, and which comprises the multi-outlet valve of the invention. The valve control circuit embodiment of FIG. 15 is similar to the autotransformer control circuit embodiment depicted in FIG. 14. Once the signal received from a second integrated circuit IC2 is supplied to a diode element designated D4 in FIG. 15, the valve control circuit operates like the autotransformer control circuit, with two differences. The first difference pertains to the DC motor which is under the control of the respective circuits. The valve control circuit includes motor 160 associated with each piston of the valves, and the autotransformer control circuit includes motor 126 (FIGS. 14 and 17), which is connected to the autotransformer. Moreover, the variable resistor designated R8 in FIG. 15 represents the voltage from potentiometer 162 in the valve control circuit, whereas the variable resistor designated R2 in the autotransformer control circuit of FIG. 14 represents the voltage setting of the autotransformer. Once a signal has reached D4, the operating principle of the valve control circuit is otherwise the same as the operating principle of the autotransformer control circuit described above.

The principal difference between the operation of the valve control circuit of FIG. 15 and the autotransformer control circuit of FIG. 14, is the provision in the former of second integrated circuit IC2 which determines the magnitude of the signal received by D4 depending on a signal received from a circuit element designated S2 in FIG. 15.

In operation, second integrated circuit IC2 connects one and only one of its four possible inputs to its output. The particular input connected to the output is selected based upon the signal which integrated circuit IC2 receives from S1. For example, with S1 in the position indicated as 0°, integrated circuit IC2 connects R4 to diode element D4, by internally relaying the signal from input terminal number one (In-1) to output terminal number one (Out-1). Thus, Integrated circuit IC2 can be considered to be an electronically operated equivalent to a mechanical switch or relay, and has the advantage of smaller size over the switch or the relay. Second integrated circuit IC2 is preferably a type "4066" integrated circuit or a similar analog switch, and is known in the industry as a "quad analog switch."

The signal which passes through the second integrated circuit as previously described, is a voltage which may range from essentially zero volts (ground) to practically the reference voltage V+ which is applied through a variable resistor R3. This applied voltage passing through the second integrated circuit is supplied to one of the inputs of comparators C3 and C4. A second voltage derived from a variable resistor R8 is applied to the other comparator inputs. Preferably, the comparators are type "339" integrated circuits or similar comparators. The ultimate purpose of these comparators is to cause the rotation of the DC motor associated with each of the cylinder chambers of the multi-outlet, variable flow, gas valve, in the correct direction to open or close the valve as desired and determined by the voltage arriving at the comparators from second integrated circuit IC2. In operation, the comparators compare the voltage at their plus and minus input terminals and produce a "high" or "low" output according to well known rules of their operation. Typically, zero volts constitutes the low output of a comparator, and the approximate applied voltage to the comparator constitutes the high output of a comparator.

As shown in FIG. 15, comparators C3 and C4 provide their output to a third integrated circuit IC3, which is "hard-wired" to yield an output depending upon whether the outputs received from comparators C3 and C4 are high and low, or low and high, respectively. For example, if the C3 output is high, then the C4 output will be low, and third integrated circuit IC3 will connect the DC motor of a particular variable flow gas valve via a diode designated D5, to the AC power supply. Thus, the motor will be driven by half wave direct current which will cause the motor to rotate in a given direction. Alternatively, if comparator C3 output is low, then comparator C2 output will be high, and integrated circuit IC3 will connect the DC motor via a diode designated D6, such that the resulting half wave direct current causes the motor to rotate in a direction opposite the previous direction. When the motor rotates, it opens/closes the valve associated therewith and also rotates the potentiometer associated with the indicator means of the valve. This potentiometer is represented schematically in FIG. 15 by the designation R8 and supplies a voltage to comparators C3, C4, and thereby indicates the relative amount of flow permitted by the piston inside the valve's cylinder chamber. In practice, the valve control circuit operates by running the motor, and in turn the valve and potentiometer R8, until the voltage at the wiper of R8 is essentially equal to the set voltage arriving at comparators C3, C4 from second integrated circuit IC2. Third integrated circuit IC3 may conveniently be any of several commercially available motor driver integrated circuits, or it may be comprised of discreet transistors and associated passive components.

Each variable resistor R4, R5, R6 and R7 of the valve control circuit embodiment of FIG. 15, corresponds to the valve setting considered optimum for a particular patient when the head section of the frame is positioned at one of the four head section articulation ranges, namely 0° to 31°, 31° to 44°, 44° to 55°, and 55° to the maximum articulation angle, which typically is 62°. Second integrated circuit IC2 receives a reference signal indicating the current range of the angle of elevation of the head section of the frame and accordingly selects the path of the applied signal through one of variable resistors R4, R5, R6 or R7.

Each of the variable resistors designated R4, R5, R6 and R7 is only accessible to service technicians of the present invention, and not accessible to the patient or attending medical staff. These variable resistors are preset by the service technician to a resistance level corresponding to the valve setting, and thus support zone pressure level, that is suited to the patient at a particular range of elevation angle of the head section of the frame.

Figure 16:
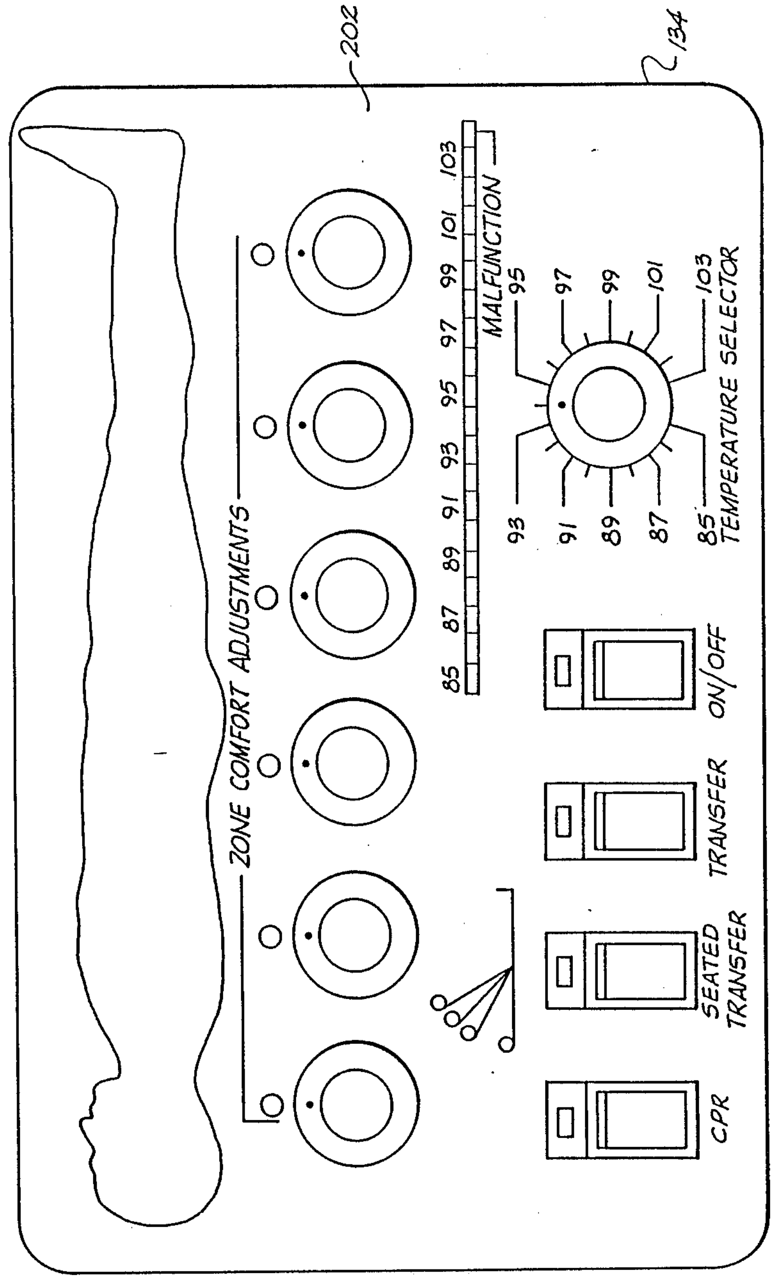
FIG. 16 is a front plan view of a component of an embodiment of the present invention.

Referring to FIG. 15, R3 preferably is a variable resistor in series with each of variable resistors R4, R5, R6 and R7. R3 is associated with an adjustment which is accessible to the patient as a "comfort" adjustment and is approximately five percent of the total resistance represented by R3 and any one of the other four resistances, R4, R5, R6 or R7. As shown in FIG. 16, the patient or nursing staff has access to R3 by a "ZONE COMFORT ADJUSTMENT" knob, which is attached to the shaft of R3 and mounted on a front panel 202 of control box 134.

Figure 3A:
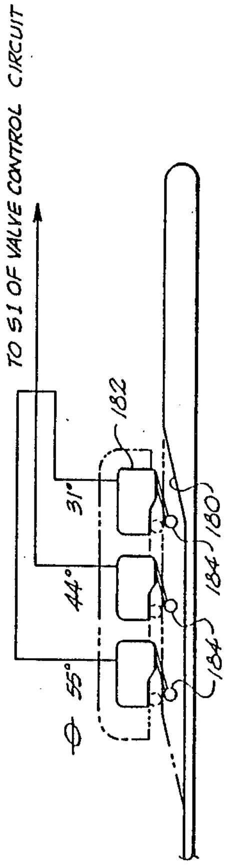
FIG. 3*a* is a schematic view of components of an embodiment of the present invention.

In accordance with the present invention, there is provided articulation sensing means associated with the frame for determining the degree of elevation of the head portion of the frame. As embodied herein and shown for example in FIGS. 3 and 3*a*, the articulation sensing means of the present invention preferably comprises a rod 76 having one end communicating with an articulatable section of the frame, for example the head section, whereby articulating movement of the articulatable section displaces rod 176 along the longitudinal axis thereof, as indicated by a double headed arrow 178. As shown in FIG. 3*a*, the other end of rod 176 has a cam 180.

The articulating sensing means further preferably comprises a plurality of cam-actuatable switches 182, whereby upon displacement of rod 176 along the longitudinal axis thereof, cam 180 actuates each one of switches 182 in succession. The longitudinal movement of the cam is calibrated to the angular movement of the articulatable section from a horizontal reference plane. This angle is designated in FIG. 3 by the Greek letter theta $\theta$. When the cam strikes a depending member 184 of the first encountered cam-actuatable switch, a signal is sent to each of the valve control circuits of the present invention. This signal is equivalent to that schematically illustrated in FIG. 15 as produced from (V+) by the action of S1.

Two additional alternative embodiments are envisioned for the articulation sensing means. One alternative embodiment of the articulation sensing means comprises a light transmitter and a light receiver communicating with one another through a disk associated with the shaft about which the articulated member would rotate. The disk has a plurality of holes therein that can be provided to correlate with the angle of articulation of the articulating member. Accordingly, articulation of the articulating member by a particular angle of rotation positions one of the holes in the disk between the light transmitter and the light receiver such that the light receiver sends a signal in response to the light transmitted from the light transmitter. A GE type H-13A1 photon coupled interrupter module constitutes one example of a suitable light transmitter and light receiver for this purpose.

Another embodiment of the articulation sensing means comprises a spring-loaded retractable tape having a plurality of holes therethrough along the length thereof. The tape can be attached to the end of rod 176 for example. A light transmitter and a light receiver are positioned opposite one another on opposite sides of the tape. Accordingly, longitudinal movement of the rod withdraws the tape and at some point positions one of the holes between the light transmitter and the light receiver, thus permitting transmission of light between the two and actuation of the receiver to send a signal to the valve control circuit. Alternatively, the end of the tape can be directly attached to the articulating member rather than attached to the end of rod 176.

In further accordance with the present invention, the valve control circuit further comprises articulation pressure adjustment means which is operatively associated with the articulation sensing means to vary gas pressure in sacks located in each of the support zones of the support structure of the present invention. The articulation pressure adjustment means varies the gas pressure in a particular zone according to the degree of elevation of an articulatable section of the frame as determined by the articulation sensing means. As embodied herein and shown for example in FIG. 15, the articulation pressure adjustment means preferably comprises a plurality of variable resistors R4, R5, R6 and R7 and an integrated circuit having a plurality of input terminals and a plurality of output terminals. Each of the variable resistors communicates with one of the input terminals of the integrated circuit, which receives a signal from the articulation sensing means. Second integrated circuit IC2 selects which of the variable resistors is to be used to form the circuit that supplies the applied voltage to diode element D4, based upon the signal received from the articulation sensing means.

Second integrated circuit IC2 (FIG. 15) associates the signal received from the bank of cam-actuatable switches 182, with a particular angular range of articulation of a section of the frame. When none of switches 182 has been actuated by cam 180, second integrated circuit IC2 receives a signal indicating that the head section is at an angular range of articulation of between 0° and 31° from the horizontal, i.e., unarticulated position. Thus, when the cam travels longitudinally further in response to further articulation of the head section of the frame, the first encountered cam-actuatable switch is tripped and closed. Then the signal sent to second integrated circuit IC2 indicates articulation of head section at an angle between 31° and 44° from the horizontal. Similarly, tripping of the second-encountered cam-actuatable switch by cam 180, sends a signal to second integrated circuit IC2 indicating that the head section has passed through an angle of 44° from the horizontal plane.

As explained above, reception of these signals by second integrated circuit IC2 of each of the six valve control circuits, causes the particular valves of the multi-outlet, variable flow, gas valve controlled by that circuit, to open and close in accordance with the preset variable resistors R4, R5, R6 and R7 of that circuit. These variable resistors correspond to each range of angular settings sensed by the articulation sensing means. For example, R4 corresponds to the 0° to 31° range, R5 to the 31° to 44° range, etc. These variable resistors have been preset by technical personnel to provide the proper pressure in the sacks for the particular patient resting atop the patient support structure of the present invention, with the head section articulated at the angular range associated with that variable resistor setting.

The "stick man" display of control box 134 (FIG. 16) indicates the present articulation angle of the head section of the frame. This display is also useful to the service technician who is responsible for setting the initial adjustments to R4, R5, R6 and R7 of the valve control circuit shown in FIG. 15.

According to the present invention, up to two smaller sacks can be shifted from zone one to zone two by means of piping and valve connections. Thus, zone two comprises either two, three or four sacks, depending upon the piping connection effected by the valves to be described below. If zone two comprises only two smaller sacks, then zone one comprises three smaller sacks and one larger sack. Similarly, if zone two comprises three smaller sacks, then zone one comprises two smaller sacks and one larger sack. Furthermore, if zone two comprises four smaller sacks, then zone one comprises one larger sack and one smaller sack.

In accordance with the present invention, gas flow switching means is provided in association with certain of the sacks for switching these certain sacks between adjacent support zones for accommodation of patients of differing heights and weights. The gas flow switching means is associated with these certain sacks to permit them to be switched between adjacent support zones. As embodied herein and shown for example in schematic in FIG. 11, the gas flow switching means for switching certain sacks between adjacent zones for accommodation of patients of differing heights and weights preferably comprises a valve network. For ease of reference, the sacks in FIG. 11 have been numbered consecutively, one through sixteen, with sack 1 being the larger sack in zone one and sack 16 being the larger sack in zone six. Preferably, the valve network comprises four manually operated on/off valves. As shown in FIG. 11, one valve 186 is connected between the fourth sack and a pipe manifold 194 for zone one, and a second valve 188 is connected between the third sack and the pipe manifold for zone one. A third valve 190 is connected between the third sack and a pipe manifold 196 for zone two, and a fourth valve 192 is connected between the fourth sack and a pipe manifold for zone two.

In order to have sacks 1 and 2 included in zone one and sacks 3 and 4 included in zone two along with sacks 5 and 6, valves 186 and 188 should be closed and valves 190 and 192 should be open. In order to include three sacks in each of zones one and two, and in particular sacks 1, 2 and 3 in zone one and sacks 4, 5 and 6 in zone two, valves 186 and 190 should be closed and valves 188 and 192 should be open. In order to include four sacks, namely sacks 1, 2, 3 and 4, in zone one and two sacks, namely, sacks 5 and 6, in zone two, it is necessary to open valves 186 and 188 and close valves 190 and 192.

In further accordance with the present invention, at least certain of the sacks in certain of the support zones have valve means associated therewith for total deflation of individual sacks so that upon full deflation, the patient can be removed from the support structure of the invention and alternatively the patient can be manipulated for facilitating a predetermined patient treatment procedure, such as cardiopulminary resuscitation (CPR). In accordance with the present invention, certain support zones have deflation valve means associated therewith for total deflation of the sacks in those certain support zones. As embodied herein and shown schematically for example in FIG. 11, the total deflation valve means preferably comprises a solenoid operated valve 198. One such valve is provided in the piping which connects the gas blower to the zone one pipe manifold 194, and another solenoid operated valve is provided in the piping which connects the gas blower to the zone two pipe manifold 196. Upon activation of either solenoid operated valve 198, the valve vents the respective pipe manifold, and accordingly the gas sacks connected thereto, to atmosphere through a venting line 200.

Activation of the "CPR" switch of control box 134 (FIG. 16) deprives the blower of electrical power and actuates two solenoid valves 198 which speed the gas outflow from the sacks of support zones one and two. Deflation of the sacks of zones one and two facilitates the CPR procedure by resting the upper torso of the patient on the rigid plates of the upper frame.

FIG. 15 also shows two additional features of the valve control circuit of the present invention, and these features are represented schematically by S2 and S3, which are both operator accessible switches on the control panel depicted in FIG. 16. S2 corresponds to the switch labelled "SEATED TRANSFER" in FIG. 16, and S3 corresponds to the switch labelled "TRANSFER".

Operation of S2 brings the comparator inputs to which S2 is connected, to essentially zero voltage. This zero voltage condition corresponds to a fully closed valve and overrides the voltage signal arriving from the second integrated circuit IC2. The fully closed valve function obtained by actuation of S2 is employed in zone three to provide the seated transfer function, and accordingly S2 only exists in the valve control circuit associated with the valve which supplies support zone three. In the zone three valve control circuit, an additional resistor is employed between D4 and IC2 to limit the current flowing through S2 to ground.

To explain the seated transfer function performed by the present invention, it becomes necessary to refer to FIGS. 2, 7, 11 and 15. As shown in FIGS. 2 and 11, zone three comprises sacks numbered 7 through 9. The patient shown in FIG. 2 is moved to a sitting position in the vicinity of support zone three. Then the SEATED TRANSFER switch on the control panel is activated. Activation of S2 (FIG. 15) closes the valve (FIG. 7) controlling the gas supply means leading to the sacks in support zone three. Since the air blower no longer can supply air to sacks 7–9, the weight of the patient sitting thereon causes the sacks to deflate and accordingly lowers the patient to the height of the membrane resting atop the upper surface of the upper frame member. At the same time, the sacks on either side of zone three remain inflated and provide arm rests for the patient to assist the patient in dismounting from the support structure.

Operation of S3 brings the comparator inputs to which it is connected, to essentially the input voltage (V+) and in the process overrides the voltage signal from second integrated circuit IC2. Thus, operation of S3 causes the valve to become fully open and is employed in the valve control circuit for all six zones to provide the transfer function. Although not shown in FIG. 15, operation of S3 also causes an audible alarm and advances the autotransformer to produce full voltage across the blower motor using the circuitry depicted in FIG. 14. Thus, with the blower at its maximum speed and the valves to each of the six zones fully open, all of the sacks are receiving maximum air flow and becoming overinflated. This overinflated condition renders the sacks very firm and permits the patient to be more easily slid off the top walls of the sacks for transfer to a different bed or stretcher.

FIG. 16 illustrates a plan view of a control panel 202 provided for the operation of some of the features of the present invention. For example, the switch labelled "ON/OFF" controls the provision of electrical power to all of the air supply components, while permitting the elevation controls and the like of the bed to remain operational.

The "TEMPERATURE SELECTOR" control knob provides a means to manually control a standard gas heater and an optional cooling fan. The bar graph display above the temperature selector knob is employed to monitor and display the temperature of the gas supplied to the gas sacks. An over temperature protection circuit (not shown) shuts down the heater if the temperature of the gas exceeds 104.5° F., a patient threatening temperature.

In further accordance with the present invention, deflation detection means are provided for detecting a predetermined degree of deflation in at least one of the plurality of sacks atop the frame of the support structure of the present invention. As embodied herein and shown for example in FIG. 11, the deflation detection means preferably comprises at least one force sensitive switch 204 provided atop the plates forming the upper planar surface of the upper frame member. The force sensitive switches are located between the plates and the neoprene sheet upon which the bottom walls of the gas sacks rest. These switches are activated when the body forces of the patient cause these switches to close. Additional circuitry (not shown) is provided to enable the bottoming detectors to actuate an audible alarm and provide a signal to the comparators which will cause the valve associated with the affected zone to open until air flow is sufficient to eliminate the bottoming condition.

Indicator means are provided in accordance with the present invention for communicating with the deflation detection means and being actuated by same when the deflation detection means is actuated upon detecting a predetermined degree of deflation in at least one of the sacks. As embodied herein and shown for example in FIG. 16, the indicator means preferably comprises a small red/green light emitting diode (LED) which changes from a normal green illumination to a red illumination upon actuation by a signal received from one of force sensitive switches 204. The small red/green light emitting diodes (LED) are positioned immediately above the "ZONE COMFORT ADJUSTMENT" knobs, which correspond to variable flow resistor R3 of FIG. 15, on control panel 202 of control box 134. The LED's change from their normal green illumination to a red illumination, if actuated when a "bottoming" condition is detected by one of a plurality of force sensitive switches 204 (FIG. 11) provided atop the plates forming the upper planar surface of the upper frame member.

It will be apparent to those skilled in the art that various modifications and variations can be made in the improved patient support structure of the present invention and in the construction of the gas distribution valve without departing from the scope or spirit of the invention. Thus, it is intended that the present invention cover the modifications and variations of this invention, provided they come within the scope of the appended claims and their equivalents.

What is claimed is:

1. A multi-outlet, variable flow gas valve comprising:

(a) a housing defining an inlet and a passageway, said inlet communicating with said passageway;

(b) at least two cylinder chambers defined within said housing and communicating with said passageway, each said chamber having a longitudinal centerline therethrough;

(c) a discrete outlet defined in said housing for each said cylinder chamber and communicating therewith, said outlet being disposed perpendicularly to said longitudinal centerline of said cylinder chamber; and (d) means for variably controlling communication of said inlet with each said outlet through said passageway and each said cylinder chamber, said variable communication control means comprising:

(i) a piston slidably received within each said cylinder chamber, said piston blocking all communication between each said outlet and said inlet when said piston is oriented at at least one predetermined location within said cylinder chamber, said piston permitting maximum communication between said outlet and said inlet through said cylinder chamber when said piston is oriented at another predetermined location within said cylinder chamber, said piston permitting a predetermined degree of communication between said outlet and said inlet through said cylinder chamber depending on the orientation of said piston within said cylinder chamber; and (ii) means for orienting said piston at a predetermined location within said cylinder chamber, said means for orienting said piston comprising:

(i') a threaded opening extending through said piston and concentric with said longitudinal center line thereof;

(ii') a rotatable shaft having a threaded exterior portion engaging said threaded opening of said piston;

(iii') means for rotating said shaft whereby rotation of said shaft causes displacement of said piston along said shaft in said cylinder chamber, the direction of said displacement depending on the direction of rotation of said shaft; and (iv') means for precluding full rotation of said piston, said rotation preclusion means comprising a projection associated with said piston and having a free end extending into each said outlet of said housing.

2. A valve as in claim 1, further comprising:

means for indicating the degree of communication between each said outlet and said passageway, being permitted by said piston.

3. A valve as in claim 2, wherein:

said indicating means comprises a potentiometer having a rotatable axle associated with said rotatable shaft, for varying the voltage output of said potentiometer depending upon the number of rotations of said shaft and said axle attached thereto.

4. A valve as in claim 3, further comprising:

a flow restriction means for each said outlet, each said flow restriction means being defined by said housing between each said cylinder chamber and each said outlet, each said flow restriction means having an elongated-shaped opening, the longitudinal axis of said elongated-shaped opening being oriented parallel to the longitudinal axis of said shaft.

5. A valve as in claim 1 wherein:

said means for rotating said shaft comprises a motor attached thereto.

6. A valve as in claim 1, further comprising:

a flow restriction means for each said outlet, each said flow restriction means being defined by said housing between each said cylinder chamber and each said outlet, each said flow restriction means having an elongated-shaped opening, the longitudinal axis of said elongated-shaped opening being oriented parallel to the longitudinal axis of said shaft.

7. A multi-outlet, variable flow gas valve, comprising:

(a) a housing defining an inlet and a passageway, said inlet communicating with said passageway;

(b) at least two cylinder chambers defined within said housing and communicating with said passageway, each said chamber having a longitudinal centerline therethrough;

(c) a discrete outlet defined in said housing for each said cylinder chamber and communicating therewith, said outlet being disposed perpendicularly to said longitudinal centerline of said cylinder chamber, said outlet including a flow restriction means for each said outlet, each said flow restriction means being defined by said housing between each said cylinder chamber and each said outlet, each said flow restriction means having an elongated-shaped opening, the longitudinal axis of said elongated-shaped opening being oriented parallel to the longitudinal axis of said shaft; and (d) means for variably controlling communication of said inlet with each said outlet through said passageway and each said cylinder chamber, said variable communication control means comprising:

(i) a piston slidably received within each said cylinder chamber, said piston blocking all communication between each said outlet and said inlet when said piston is oriented at at least one predetermined location within said cylinder chamber, said piston permitting maximum communication between said outlet and said inlet through said cylinder chamber when said piston is oriented at another predetermined location within said cylinder chamber, said piston permitting a predetermined degree of communication between said outlet and said inlet through said cylinder chamber depending on the orientation of said piston within said cylinder chamber; and (ii) means for orienting said piston at a predetermined location within said cylinder chamber, said means for orienting said piston comprising:

(i') a threaded opening extending through said piston and concentric with said longitudinal center line thereof;

(ii') a rotatable shaft having a threaded exterior portion engaging said threaded opening of said piston;

(iii') means for rotating said shaft whereby rotation of said shaft causes displacement of said piston along said shaft in said cylinder chamber, the direction of said displacement depending on the direction of rotation of said shaft; and (iv') means for precluding full rotation of said piston, said rotation preclusion means comprising a projection having one end fixed to said piston and the opposite end extending perpendicularly to the longitudinal centerline of said piston into said elongated shaped opening of said housing.

8. A single outlet, variable flow gas valve, comprising:

(a) a housing defining an inlet and a passageway, said inlet communicating with said passageway;

(b) a cylinder chamber defined within said housing and communicating with said passageway, said chamber having a longitudinal centerline therethrough;

(c) a discrete outlet defined in said housing and communicating with said cylinder chamber, said outlet being disposed perpendicularly to said longitudinal centerline of said cylinder chamber; and (d) means for variable controlling communication of said inlet with said outlet through said passageway and said cylinder chamber, said variable communication control means comprising:

(i) a piston slidable received within said cylinder chamber, said piston blocking all communication between said outlet and said inlet when said piston is oriented at at least one predetermined location within said cylinder chamber, said piston permitting maximum communication between said outlet and said inlet through said cylinder chamber when said piston is oriented at another predetermined location within said cylinder chamber, said piston permitting a predetermined degree of communication between said outlet and said inlet through said cylinder chamber depending on the orientation of said piston within said cylinder chamber; and (ii) means for orienting said piston at a predetermined location within said cylinder chamber said means for orienting said piston comprising:

(i') a threaded opening extending through said piston and concentric with said longitudinal center line thereof;

(ii') a rotatable shaft having a threaded exterior ,portion engaging said threaded opening of said piston;

(iii') means for rotating said shaft whereby rotation of said shaft causes displacement of said piston along said shaft in said cylinder chamber, the direction of said displacement depending on the direction of rotation of said shaft; and (iv') means for precluding full rotation of said piston, said rotation preclusion means comprising a projection associated with said piston and having a free end extending perpendicularly to the longitudinal centerline of said piston into said outlet of said housing.

9. A valve as in claim 8, further comprising:

means for indicating the degree of communication between said outlet and said passageway, being permitted by said piston.

10. A valve as in claim 9, wherein:

said indicating means comprises a potentiometer having a rotatable axle associated with said rotatable shaft, for varying the voltage across said potentiometer depending upon the number of rotations of said shaft and said axle attached thereto.

11. A valve as in claim 10, further comprising:

a flow restriction means for said outlet, said flow restriction means being defined by said housing between said cylinder chamber and said outlet, said flow restriction means having an elongated-shaped opening, the longitudinal axis of said elongated-shaped opening being oriented parallel to the longitudinal axis of said shaft.

12. A valve as in claim 8, wherein:

said means for rotating said shaft comprises a motor attached thereto.

13. A valve as in claim 8, further comprising:

a flow restriction means for said outlet, said flow restriction means being defined by said housing between said cylinder chamber and said outlet, said flow restriction means having an elongated-shaped opening, the longitudinal axis of said elongated-shaped opening being oriented parallel to the longitudinal axis of said shaft.

14. A single outlet, variable flow gas valve comprising:

(a) a housing defining an inlet and a passageway, said inlet communicating with said passageway;

(b) a cylinder chamber defined within said housing and communicating with said passageway, said chamber having a longitudinal centerline therethrough;

(c) a discrete outlet defined in said housing and communicating with said cylinder chamber, said outlet being disposed perpendicularly to said longitudinal centerline of said cylinder chamber and having a flow restriction means being defined by said housing between said cylinder chamber and said outlet, said flow restriction means having an elongated-shaped opening, the longitudinal axis of said elongated-shaped opening being oriented parallel to the longitudinal axis of said shaft; and (d) means for variably controlling communication of said inlet with said outlet through said passageway and said cylinder chamber, said variable communication control means comprising:

(i) a piston slidably received within said cylinder chamber, said piston blocking all communication between said outlet and said inlet when said piston is oriented at at least one predetermined location within said cylinder chamber, said piston permitting maximum communication between said outlet and said inlet through said cylinder chamber when said piston is oriented at another predetermined location within said cylinder chamber, said piston permitting a predetermined degree of communication between said outlet and said inlet through said cylinder chamber depending on the orientation of said piston within said cylinder chamber; and (ii) means for orienting said piston at a predetermined location within said cylinder chamber, said means for orienting said piston comprising:

(i') a threaded opening extending through said piston and concentric with said longitudinal center line thereof;

(ii') a rotatable shaft having a threaded exterior portion engaging said threaded opening of said piston;

(iii') means for rotating said shaft whereby rotation of said shaft causes displacement of said piston along said shaft in said cylinder chamber, the direction of said displacement depending on the direction of rotation of said shaft; and (iv') means for precluding full rotation of said piston, said rotation preclusion means comprising a projection having one end fixed to said piston and the opposite end extending into said elongated-shaped opening of said housing.

* * * * *

UNITED STATES PATENT AND TRADEMARK OFFICE

CERTIFICATE OF CORRECTION

PATENT NO. : 4,798,227

DATED : January 17, 1989

INVENTOR(S) : Vernon L. Goodwin

It is certified that error appears in the above-identified patent and that said Letters Patent is hereby corrected as shown below:

Column 11, line 61: change "sal" to read --seal--.

Column 17, line 2: change "S2" to read --S1--.

Column 18, line 44: change "76" to read --176--.

Claim 8, column 25, line 40: change "slidable" to read --slidably--.

Claim 8, column 25, line 61: delete "," before the word "portion".

Signed and Sealed this

Twenty-seventh Day of June, 1989

*Attest:*

DONALD J. QUIGG

*Attesting Officer* *Commissioner of Patents and Trademarks*